(12) United States Patent
Luo

(10) Patent No.: US 10,428,920 B2
(45) Date of Patent: Oct. 1, 2019

(54) DEVICE FOR CONVERTING RECIPROCATING RECTILINEAR MOTION INTO ONE-WAY CIRCULAR MOTION AND TRANSPORTATION VEHICLE USING DEVICE

(71) Applicants: SHENZHEN NANBO AUTOMATION EQUIPMENT CO., LTD, Shenzhen (CN); Shenzhen Zhouwu Technology Co., Ltd, Shenzhen (CN)

(72) Inventor: Liyuan Luo, Shenzhen (CN)

( * ) Notice: Subject to any disclaimer, the term of this patent is extended or adjusted under 35 U.S.C. 154(b) by 130 days.

(21) Appl. No.: 15/811,237

(22) Filed: Nov. 13, 2017

(65) Prior Publication Data
US 2018/0066741 A1 Mar. 8, 2018

Related U.S. Application Data

(63) Continuation of application No. PCT/CN2016/072169, filed on Feb. 29, 2016.

(30) Foreign Application Priority Data

May 14, 2015 (CN) .......................... 2015 1 0246200
Nov. 30, 2015 (CN) .......................... 2015 1 0859332

(51) Int. Cl.
*F03G 5/00* (2006.01)
*F16H 37/12* (2006.01)
(Continued)

(52) U.S. Cl.
CPC ............. *F16H 37/124* (2013.01); *B62M 1/30* (2013.01); *F03G 5/06* (2013.01); *F16H 3/003* (2013.01); *F16H 19/043* (2013.01)

(58) Field of Classification Search
CPC . F03G 5/06; F16H 19/02; F16H 19/04; F16H 19/043; F16H 37/124; Y10T 74/18056
See application file for complete search history.

(56) References Cited

U.S. PATENT DOCUMENTS

| 5,094,202 A * | 3/1992 | Belford .................. F01B 9/047 |
| | | 123/197.4 |
| 2011/0138939 A1* | 6/2011 | Carr ........................ F01B 9/047 |
| | | 74/32 |

(Continued)

FOREIGN PATENT DOCUMENTS

| CN | 1199001 A | 11/1998 |
| CN | 1778630 A | 5/2006 |

(Continued)

OTHER PUBLICATIONS

International Search Report of PCT/CN2016/072169, dated May 5, 2016.

*Primary Examiner* — Phillip A Johnson
(74) *Attorney, Agent, or Firm* — Erson IP (Nelson IP)

(57) ABSTRACT

A device for converting reciprocating rectilinear motion into unidirectional circular motion is provided, which is capable of converting a man-powered rectilinear motion into a unidirectional circular motion by a combination of a rack and a gear, or a combination of a chain and a chain wheel, or a combination of a belt and a belt wheel, and under the conversion of a plurality of gear sets and unidirectional bearings. Each of the gear sets comprises a large gear, a medium gear and a small gear, thus transformation of output torque and a rotating speed can be achieved by transverse sliding meshing of the gear sets, and this speed regulation is quite convenient. In addition, the gear sets in a main body are randomly arranged according to actual needs, such as (Continued)

rectilinear arrangement, triangular arrangement and the like. In addition, a transportation vehicle using the device is also provided.

16 Claims, 24 Drawing Sheets

(51) Int. Cl.
  *B62M 1/30*    (2013.01)
  *F03G 5/06*    (2006.01)
  *F16H 19/04*    (2006.01)
  *F16H 3/00*    (2006.01)

(56) References Cited

U.S. PATENT DOCUMENTS

2014/0306420 A1* 10/2014 Schminkey .............. B62M 1/16
                        280/242.1
2015/0267794 A1*  9/2015 Rajendran ............... F16H 29/20
                         74/121
2016/0290452 A1* 10/2016 Ransil .................. F16H 19/043

FOREIGN PATENT DOCUMENTS

| | | | |
|---|---|---|---|
| CN | 201023618 Y | 2/2008 | |
| CN | 201283994 Y | 8/2009 | |
| CN | 104989799 A | 10/2015 | |
| CN | 204784545 U | 11/2015 | |
| EP | 2353987 A1 * | 8/2011 | ............ B62M 1/30 |

\* cited by examiner

US 10,428,920 B2

DEVICE FOR CONVERTING RECIPROCATING RECTILINEAR MOTION INTO ONE-WAY CIRCULAR MOTION AND TRANSPORTATION VEHICLE USING DEVICE

CROSS-REFERENCE TO RELATED APPLICATIONS

This application is a continuation of International Patent Application No. PCT/CN2016/072169 with a filing date of Feb. 29, 2016, and further claims priority to Chinese Patent Application No. 201510246200.X with a filing date of May 14, 2015 and No. 201510859332.X with a filing date of Nov. 30, 2015. The content of the aforementioned applications, including any intervening amendments thereto, are incorporated herein by reference.

TECHNICAL FIELD

The present invention relates to the technical field of motion mode conversion, and particularly relates to a device for converting reciprocating rectilinear motion into unidirectional circular motion and a transportation vehicle using the device.

BACKGROUND OF THE PRESENT INVENTION

As is well known, in a daily production process, such a situation that a rectilinear motion mode needs to be converted into a circular motion mode and even different rotating speeds are required in a circular motion process is often encountered. At this time, the situation needs to be realized by a conversion device. However, most of the existing conversion devices are relatively complicated in structure and inconvenient in speed regulation. For example, a traditional bicycle adopts a manner of pedaling in circles with both feet; since an arm of force is continuously changed between 0 and a maximum value repeatedly and a moment of force is also changed between 0 and a maximum value, physical strength and work time of riders are wasted; and a chain is changed between different chain wheels during speed regulation, so speed changing time is long.

SUMMARY OF PRESENT INVENTION

A purpose of the present invention is to provide a device for converting reciprocating rectilinear motion into unidirectional circular motion, wherein the device has a simple and compact structure and can rapidly convert a reciprocating rectilinear motion mode into a unidirectional circular motion mode. The present invention also provides a transportation vehicle using the device for converting reciprocating rectilinear motion into unidirectional circular motion.

The present invention is achieved as follows:

A device for converting reciprocating rectilinear motion into unidirectional circular motion is provided. The device for converting reciprocating rectilinear motion into unidirectional circular motion comprises a main body as well as a reciprocating rectilinear motion mechanism, a rectilinear motion conversion mechanism and a circular motion outputting mechanism arranged in the main body. The reciprocating rectilinear motion mechanism is connected with the rectilinear motion conversion mechanism in a transmission manner. The rectilinear motion conversion mechanism converts the reciprocating rectilinear motion outputted by the reciprocating rectilinear motion mechanism into bidirectional circular motion. The rectilinear motion conversion mechanism is further connected with the circular motion outputting mechanism in a unidirectional and synchronous rotating manner. The circular motion outputting mechanism is used to output the unidirectional circular motion.

As an improvement of the device for converting reciprocating rectilinear motion into unidirectional circular motion, the rectilinear motion conversion mechanism comprises two rotating wheels oppositely arranged on both sides of the main body. A main rotating spring is arranged between each of the rotating wheels and the main body. Each rotating wheel is connected a transmission manner with one reciprocating rectilinear motion mechanism arranged on a same side with the rotating wheel. A main rotating shaft is arranged between the two rotating wheels. Both ends of the main rotating shaft are respectively connected with the rotating wheels on the same sides by unidirectional bearings in the unidirectional and synchronous rotating manner. The main rotating shaft is connected with the circular motion outputting mechanism in the transmission manner so that the rectilinear motion conversion mechanism is connected with the circular motion outputting mechanism in the unidirectional and synchronous rotating manner.

As an improvement of the device for converting reciprocating rectilinear motion into unidirectional circular motion, the device for converting reciprocating rectilinear motion into unidirectional circular motion further comprises a rotating speed regulation mechanism arranged in the main body. The rotating speed regulation mechanism comprises N gear sets, wherein N is a number greater than or equal to 2. Each of the gear sets comprises a plurality of gears different in diameter. A first gear set of the N gear sets is synchronously and rotatably connected to the main rotating shaft. The rest gear sets of the N gear sets are synchronously and rotatably connected to their corresponding rotating shafts, respectively. Both ends of the corresponding rotating shafts are respectively connected with the main body through bearings. In the N gear sets, the gear sets are sequentially connected with each other in a meshing manner. The rotating shaft corresponding to an Nth gear set is synchronously and rotatably connected with the circular motion outputting mechanism. A plurality of gear shifters are arranged in the N gear sets so that adjacent gear sets convert different mutual meshing manners under driving of the gear shifters.

As an improvement of the device for converting reciprocating rectilinear motion into unidirectional circular motion, the device for converting reciprocating rectilinear motion into unidirectional circular motion further comprises a rotating speed regulation mechanism arranged in the main body. The rectilinear motion conversion mechanism is connected with the rotating speed regulation mechanism in the unidirectional and synchronous rotating manner. The rotating speed regulation mechanism is connected with the circular motion outputting mechanism in the transmission manner. The rotating speed regulation mechanism comprises N gear sets, wherein N is a number greater than or equal to 2. Each of the gear sets comprises a plurality of gears different in diameter. Each of the gear sets is synchronously and rotatably connected with the corresponding rotating shaft, respectively. Both ends of the rotating shafts corresponding to the gear sets are respectively connected with the main body through bearings. In the N gear sets, the gear sets are sequentially connected with each other in a meshing manner. The rotating shaft corresponding to a first gear set is connected with the rectilinear motion conversion mechanism in the unidirectional and synchronous rotating manner. The rotating shaft corresponding to an Nth gear set is synchronously and rotatably connected with the circular motion outputting mechanism. A plurality of gear shifters are arranged in the N gear sets so that the adjacent gear sets convert different mutual meshing manners under driving of the gear shifters.

As an improvement of the device for converting reciprocating rectilinear motion into unidirectional circular motion, the rotating speed regulation mechanism comprises a first gear set arranged on a first rotating shaft, a second gear set arranged on a second rotating shaft and a third gear set arranged on a third rotating shaft. Each of the first gear set, the second gear set and the third gear set comprises a large gear, a medium gear and a small gear. The first gear set freely slides to a gear meshing position on the first rotating shaft under the driving of a first gear shifter, so that the large gear of the first gear set is connected with the small gear of the second gear set in a meshing manner, or so that the medium gear of the first gear set is connected with the medium gear of the second gear set in the meshing manner, or so that the small gear of the first gear set is connected with the large gear of the second gear set in the meshing manner. The third gear set freely slides to a gear meshing position on the third rotating shaft under the driving of a second gear shifter, so that the large gear of the third gear set is connected with the small gear of the second gear set in the meshing manner, or so that the medium gear of the third gear set is connected with the medium gear of the second gear set in the meshing manner, or so that the small gear of the third gear set is connected with the large gear of the second gear set in the meshing manner. The circular motion outputting mechanism is synchronously and rotatably connected with one end of the third rotating shaft so that the rotating speed regulation mechanism is connected with the circular motion outputting mechanism in the transmission manner.

As an improvement of the device for converting reciprocating rectilinear motion into unidirectional circular motion, each of the first gear shifter and the second gear shifter comprises a toggle base with a sliding chute and a center pin, a shifting lever sliding block with a speed regulation shifting lever, and a shift gear rotating cylinder with a rotating spring. The shift gear rotating cylinder is sleeved on the center pin. The shifting lever sliding block is arranged in the sliding chute in a sliding manner. The shift gear rotating cylinder is connected with the shifting lever sliding block in a driving manner. The speed regulation shifting lever is arranged adjacent to the first gear set or the third gear set.

As an improvement of the device for converting reciprocating rectilinear motion into unidirectional circular motion, the rectilinear motion conversion mechanism comprises an input gear, an input rotating shaft configured to penetrate through the main body, a main bevel gear and two side bevel gears. The input rotating shaft is connected with the main body through the bearings. The input gear is synchronously and rotatably connected with one end of the input rotating shaft located outside the main body. The main bevel gear is synchronously and rotatably connected with one end of the input rotating shaft located in the main body. Both ends of the first rotating shaft are further respectively connected with the side bevel gears by unidirectional bearings in the unidirectional and synchronous rotating manner. Each of the side bevel gears is connected with the main bevel gear in the meshing manner. The reciprocating rectilinear motion mechanisms are respectively arranged on two opposite sides of the input gear. Each of the reciprocating rectilinear motion mechanisms is connected with the input gear in the transmission manner.

As an improvement of the device for converting reciprocating rectilinear motion into unidirectional circular motion, the rectilinear motion conversion mechanism comprises an input gear, an input rotating shaft configured to penetrate through the main body, a first driving gear, a second driving gear, a first driven gear, a second driven gear, an auxiliary rotating shaft and a pinion. The input rotating shaft is connected with the main body through the bearings. The input gear is synchronously and rotatably connected with one end of the input rotating shaft located outside the main body. The first driving gear is connected with one end of the input rotating shaft located in the main body by a first unidirectional bearing in the unidirectional and synchronous rotating manner. The second driving gear is connected with one end of the input rotating shaft located in the main body by a second unidirectional bearing in the unidirectional and synchronous rotating manner. A mounting direction of the first unidirectional bearing is configured to be opposite to the mounting direction of the second unidirectional bearing. Both ends of the first rotating shaft are further synchronously and rotatably connected with the first driven gear and the second driven gear respectively. Both ends of the auxiliary rotating shaft are respectively connected with the main body through the bearings. The pinion is synchronously and rotatably connected to the auxiliary rotating shaft. The pinion is respectively connected with the first driving gear and the first driven gear in the meshing manner. The second driving gear is connected with the second driven gear in the meshing manner. The reciprocating rectilinear motion mechanisms are respectively arranged on two opposite sides of the input gear. Each of the reciprocating rectilinear motion mechanisms is connected with the input gear in the transmission manner.

As an improvement of the device for converting reciprocating rectilinear motion into unidirectional circular motion, the rectilinear motion conversion mechanism comprises an input gear, an input rotating shaft configured to penetrate through the main body, a main bevel gear and two side bevel gears. The input rotating shaft is connected with the main body through the bearings. The input gear is synchronously and rotatably connected with one end of the input rotating shaft located outside the main body. The main bevel gear is synchronously and rotatably connected with one end of the input rotating shaft located in the main body. Each of the side bevel gears is connected with the main bevel gear in the meshing manner. The reciprocating rectilinear motion mechanisms are respectively arranged on two opposite sides of the input gear. Each of the reciprocating rectilinear motion mechanisms is connected with the input gear in the transmission manner. A driving rotating shaft is arranged between the two side bevel gears. Both ends of the driving rotating shaft are connected with the side bevel gears by the unidirectional bearings in the unidirectional and synchronous rotating manner. The driving rotating shaft is connected with the circular motion outputting mechanism in the transmission manner so that the rectilinear motion conversion mechanism is connected with the circular motion outputting mechanism in the unidirectional and synchronous rotating manner.

As an improvement of the device for converting reciprocating rectilinear motion into unidirectional circular motion, the rectilinear motion conversion mechanism comprises an input gear, an input rotating shaft configured to penetrate through the main body, a first driving gear, a second driving gear, a first driven gear, a second driven gear, an auxiliary rotating shaft and a pinion. The input rotating shaft is connected with the main body through the bearings. The input gear is synchronously and rotatably connected with one end of the input rotating shaft located outside the main body. The first driving gear is connected with one end of the input rotating shaft located in the main body by a first unidirectional bearing in the unidirectional and synchronous rotating manner. The second driving gear is connected with one end of the input rotating shaft located in the main body by a second unidirectional bearing in the unidirectional and synchronous rotating manner. A mounting direction of the first unidirectional bearing is configured to be opposite to the mounting direction of the second unidirectional bearing. Both ends of the auxiliary rotating shaft are respectively connected with the main body through the bearings. The pinion is synchronously and rotatably connected to the auxiliary rotating shaft. The pinion is respectively connected with the first driving gear and the first driven gear in the meshing manner. The second driving gear is connected with the second driven gear in the meshing manner. The reciprocating rectilinear motion mechanisms are respectively arranged on two opposite sides of the input gear. Each of the reciprocating rectilinear motion mechanisms is connected with the input gear in the transmission manner. A driving rotating shaft is arranged between the first driven gear and the second driven gear. Both ends of the driving rotating shaft are synchronously and rotatably connected with the first driven gear and the second driven gear respectively. The driving rotating shaft is connected with the circular motion outputting mechanism in the transmission manner so that the rectilinear motion conversion mechanism is connected with the circular motion outputting mechanism in the unidirectional and synchronous rotating manner.

As an improvement of the device for converting reciprocating rectilinear motion into unidirectional circular motion, the reciprocating rectilinear motion mechanism comprises a rectilinear slide rail, a rack arranged on the rectilinear slide rail in a sliding manner, and a pedal arranged on the rack. The rectilinear sliding rail is fixedly arranged on the main body. The rack is connected with the rotating wheels in the meshing manner so that the reciprocating rectilinear motion mechanism is connected with the rectilinear motion conversion mechanism in the transmission manner.

As an improvement of the device for converting reciprocating rectilinear motion into unidirectional circular motion, the reciprocating rectilinear motion mechanism comprises a rectilinear slide rail, a rack arranged on the rectilinear slide rail in a sliding manner, and a pedal arranged on the rack. The rectilinear sliding rail is fixedly arranged on the main body. The rack is connected with the input gear in the meshing manner so that the reciprocating rectilinear motion mechanism is connected with the rectilinear motion conversion mechanism in the transmission manner.

As an improvement of the device for converting reciprocating rectilinear motion into unidirectional circular motion, the reciprocating rectilinear motion mechanism comprises a rectilinear slide rail, a pedal arranged on the rectilinear slide rail in the sliding manner, a transmission chain fixedly connected with the pedal, and a plurality of auxiliary chain wheels. The rectilinear sliding rail is fixedly arranged on the main body. The transmission chain is connected with the auxiliary chain wheels and the rotating wheels in a transmission linkage manner so that the reciprocating rectilinear motion mechanism is connected with the rectilinear motion conversion mechanism in the transmission manner.

As an improvement of the device for converting reciprocating rectilinear motion into unidirectional circular motion, the reciprocating rectilinear motion mechanism comprises a rectilinear slide rail, a pedal arranged on the rectilinear slide rail in the sliding manner, a transmission chain fixedly connected with the pedal, and a plurality of auxiliary chain wheels. The rectilinear sliding rail is fixedly arranged on the main body. The transmission chain is connected with the auxiliary chain wheels and the input gear in the transmission linkage manner so that the reciprocating rectilinear motion mechanism is connected with the rectilinear motion conversion mechanism in the transmission manner.

A transportation vehicle comprises a power outputting mechanism and the device for converting reciprocating rectilinear motion into unidirectional circular motion. The circular motion outputting mechanism is connected with the power outputting mechanism in a transmission manner.

As an improvement of the above transportation vehicle, the transportation vehicle is a human-powered vehicle, a child toy car, a human-powered ship or a human-powered parachute. The power outputting mechanism is wheels of the human-powered vehicle, wheels of the child toy car, propellers of the human-powered ship or propellers of the human-powered umbrella.

The present invention has beneficial effects that the present invention provides the device for converting reciprocating rectilinear motion into unidirectional circular motion. The device has a simple and compact structure and can rapidly convert a reciprocating rectilinear motion mode into a unidirectional circular motion mode by conversion of the reciprocating rectilinear motion mechanism, the rectilinear motion conversion mechanism and the circular motion outputting mechanism; and the present invention also provides the transportation vehicle using the device for converting reciprocating rectilinear motion into unidirectional circular motion.

DESCRIPTION OF THE DRAWINGS

In order to more clearly illustrate embodiments of the present invention or technical solutions in the prior art, drawings to be used in description of the embodiments or the prior art will be introduced briefly. Apparently, the drawings in the following description are just some embodiments of the present invention. Those of ordinary skill in the art can also obtain other drawings based on these drawings without contributing creative labor.

DETAILED DESCRIPTION OF PREFERRED EMBODIMENTS

Technical solutions in embodiments of the present invention will be clearly and completely described below in combination with drawings in embodiments of the present invention. Apparently, the described embodiments are only some embodiments of the present invention, rather than all embodiments. All other embodiments obtained based on embodiments in the present invention by those of ordinary skill in the art without contributing creative labor belong to a protection scope of the present invention.

Embodiment 1

Figure 1:
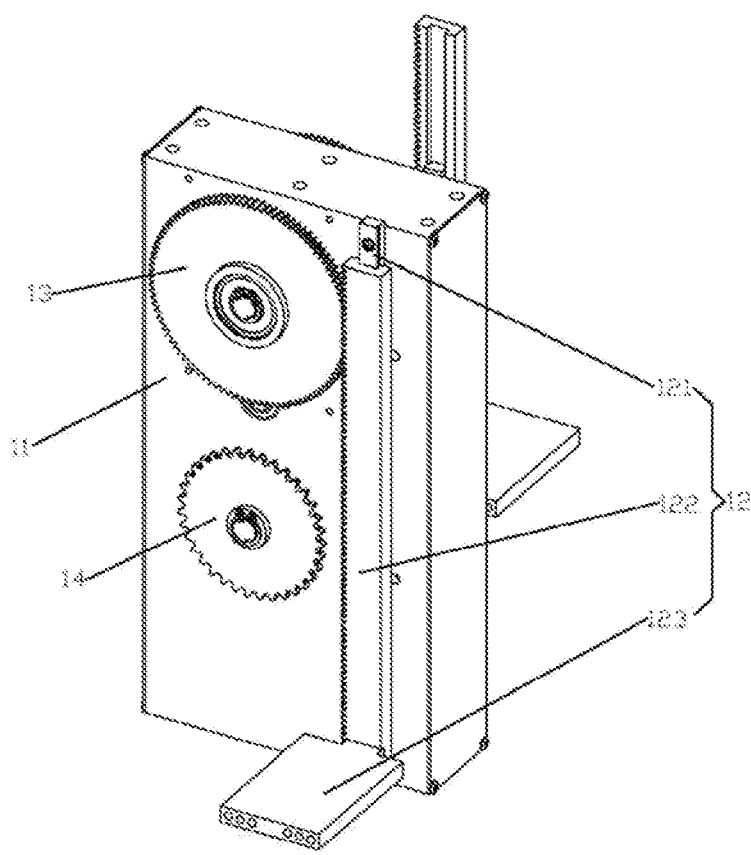
FIG. 1 is a structural schematic view of a device for converting reciprocating rectilinear motion into unidirectional circular motion according to embodiment 1.
Figure 2:
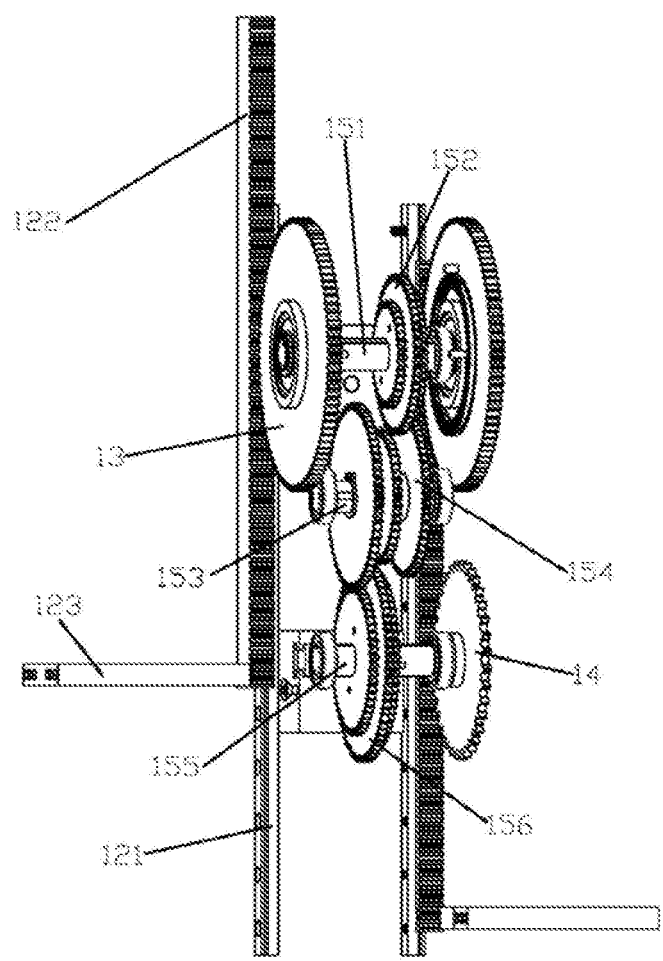
FIG. 2 is a structural schematic view of the device for converting reciprocating rectilinear motion into unidirectional circular motion without a main body shown in FIG. 1.

As shown in FIG. 1 and FIG. 2, the present embodiment provides a device 1 for converting reciprocating rectilinear motion into unidirectional circular motion. The device 1 for converting reciprocating rectilinear motion into unidirectional circular motion comprises a main body 11 as well as a reciprocating rectilinear motion mechanism 12, a rectilinear motion conversion mechanism 13 and a circular motion outputting mechanism 14 arranged in the main body 11. The reciprocating rectilinear motion mechanism 12 is connected with the rectilinear motion conversion mechanism 13 in a transmission manner. The rectilinear motion conversion mechanism 13 converts the reciprocating rectilinear motion outputted by the reciprocating rectilinear motion mechanism 12 into bidirectional circular motion. The rectilinear motion conversion mechanism 13 is further connected with the circular motion outputting mechanism 14 in a unidirectional and synchronous rotating manner. The circular motion outputting mechanism 14 is used to output the unidirectional circular motion.

The device 1 for converting reciprocating rectilinear motion into unidirectional circular motion further comprises a rotating speed regulation mechanism 15 arranged in the main body 11. The rotating speed regulation mechanism 15 comprises N gear sets, and N is a number greater than or equal to 2. Each of the gear sets comprises a plurality of gears different in diameter. Each of the gear sets is synchronously and rotatably connected to a corresponding rotating shaft respectively. Both ends of the rotating shafts are respectively connected with the main body through bearings. In the N gear sets, the gear sets are sequentially connected with each other in a meshing manner, wherein the rotating shaft corresponding to a first gear set is connected with the rectilinear motion conversion mechanism 13 in the unidirectional and synchronous rotating manner. The rotating shaft corresponding to an Nth gear set is synchronously and rotatably connected with the circular motion outputting mechanism 14. A plurality of gear shifters are arranged in the N gear sets so that the adjacent gear sets convert different mutual meshing manners under driving of the gear shifters.

In the present embodiment, the circular motion outputting mechanism 14 is an output chain wheel. The rotating speed regulation mechanism 15 comprises a first gear set 152 arranged on a main rotating shaft 151, a second gear set 154 arranged on a second rotating shaft 153 and a third gear set 156 arranged on a third rotating shaft 155. Each of the first gear set 152, the second gear set 154 and the third gear set 156 comprises a large gear, a medium gear and a small gear. The first gear set 152, the second gear set 154 and the third gear set 156 are arranged in a straight line.

Figure 3:
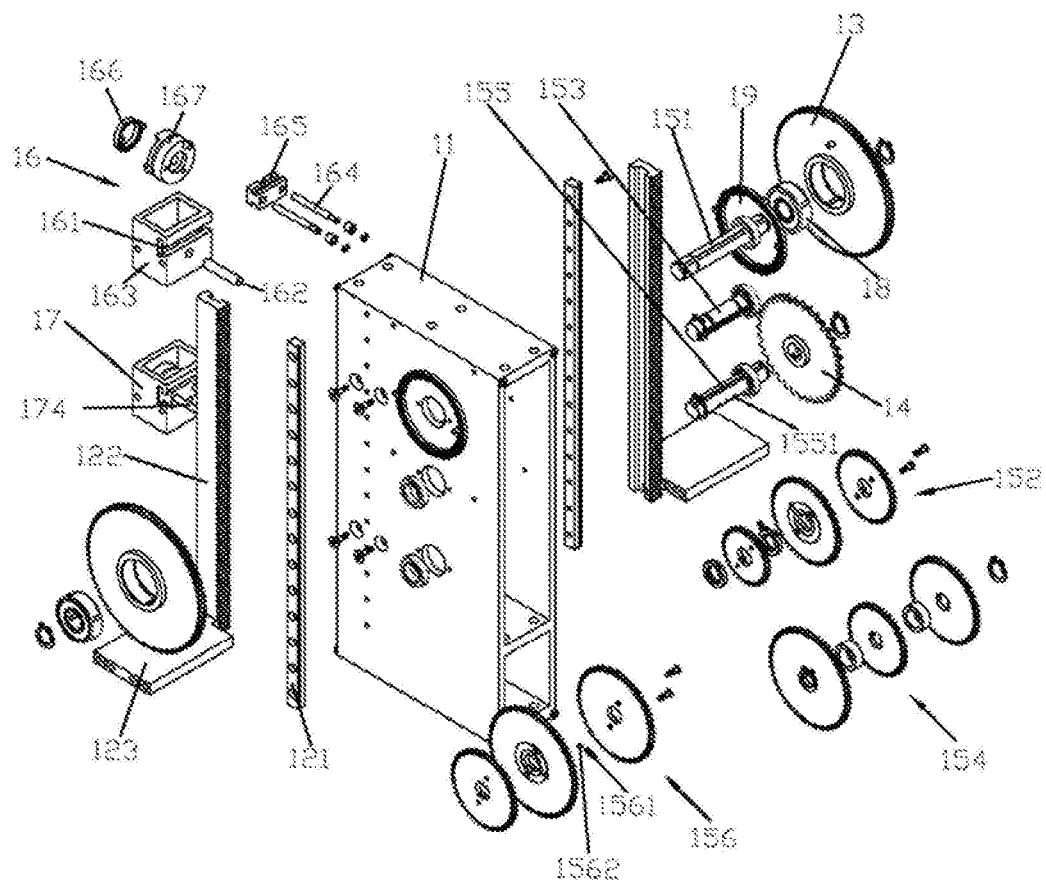
FIG. 3 is a exploded view of the device for converting reciprocating rectilinear motion into unidirectional circular motion shown in FIG. 1.

Specifically, as shown in FIG. 2 and FIG. 3, the first gear set 152 is synchronously and rotatably connected with the main rotating shaft 151 by a key groove. The first gear set 152 freely slides to a gear meshing position on the main rotating shaft 151 under driving of a first gear shifter 16 so that the large gear of the first gear set 152 is connected with the small gear of the second gear set 154 in the meshing manner, or so that the medium gear of the first gear set 152 is connected with the medium gear of the second gear set 154 in the meshing manner, or so that the small gear of the first gear set 152 is connected with the large gear of the second gear set 154 in the meshing manner. Preferably, a locating circular hole (not shown) is formed in the main rotating shaft 151; a spring and a steel ball (not shown) are arranged in the first gear set 151; and the steel ball is located in the locating circular hole of the main rotating shaft 151 by using elastic force of the spring, so as to ensure that the first gear set 152 is located on the main rotating shaft 151 in a sliding manner.

As shown in FIG. 2 and FIG. 3, both ends of the second rotating shaft 153 are respectively connected with the main body 11 through the bearings. The second gear set 153 is synchronously and rotatably connected with the second rotating shaft 154 by the key groove. Limiting structures (not shown) for preventing the second gear set 154 from sliding on the second rotating shaft 153 are arranged on the second rotating shaft 153. Preferably, the limiting structures are shaft clips arranged at both ends of the gear set 153. The third gear set 156 is synchronously and rotatably connected with the third rotating shaft 155 by the key groove. The third gear set 156 freely slides to a gear meshing position on the third rotating shaft 155 under the driving of a second gear shifter 17, so that the large gear of the third gear set 156 is connected with the small gear of the second gear set 154 in the meshing manner, or so that the medium gear of the third gear set 156 is connected with the medium gear of the second gear set 154 in the meshing manner, or so that the small gear of the third gear set 156 is connected with the large gear of the second gear set 154 in the meshing manner. Preferably, as shown in FIG. 3, a locating circular hole 1551 is formed in the third rotating shaft 155; a spring 1561 and a steel ball 1562 are arranged in the third gear set 156; and the steel ball 1562 is located in the locating circular hole 1551 of the third rotating shaft 155 by using elastic force of the spring 1561, so as to ensure that the third gear set 156 is located on the third rotating shaft 155 in the sliding manner. Both ends of the third gear set 156 are respectively connected with the main body 11 through bearings. The circular motion outputting mechanism 14 (i.e., the output chain wheel) is arranged on one side of the main body 11. The circular motion outputting mechanism 14 is synchronously and rotatably connected with one end of the third gear set 156 by the key groove.

As shown in FIG. 1, FIG. 2 and FIG. 3, the rectilinear motion conversion mechanism 13 comprises two rotating wheels oppositely arranged on both sides of the main body 11. Both ends of the main rotating shaft 151 are respectively connected with the rotating wheels on the same sides by unidirectional bearings 18 in the unidirectional and synchronous rotating manner. A main rotating spring 19 is also arranged between each of the rotating wheels and the main body 11. The reciprocating rectilinear motion mechanism 12 is arranged on a same side of each of the rotating wheels. The reciprocating rectilinear motion mechanism 12 is connected with the rotating wheel on the same side in a transmission manner. The reciprocating rectilinear motion mechanism 12 comprises a rectilinear slide rail 121, a rack 122 arranged on the rectilinear slide rail 121 in a sliding manner, and a pedal 123 arranged on the rack 122. The rectilinear sliding rail 121 is fixedly arranged on the main body 11. The rack 122 is connected with the rotating wheel on the same side in the meshing manner so that the reciprocating rectilinear motion mechanism 12 is connected with the rotating wheel on the same side in the transmission manner, and further the reciprocating rectilinear motion mechanism 12 is connected with the rectilinear motion conversion mechanism 13 in the transmission manner.

During operation, the rack 122 is controlled to make rectilinear up and down motion on the rectilinear slide rail 121 by the pedal 123, thereby driving the rotating wheels to rotate. The unidirectional bearings 18 are arranged so that the main rotating shaft 151 can only be rotated synchronously with the rotating wheels unidirectionally. When the main rotating spring 19 drives the rotating wheels to rotate, the unidirectional bearings 18 have no resistance, and the main rotating shaft 151 does not rotate. After the main rotating shaft 151 is rotated synchronously, the first gear set 152, the second gear set 154 and the third gear set 156 can be sequentially driven to rotate. Finally, under synchronous rotation of the third rotating shaft 155, the output chain wheel completes power output of the circular motion. During operation, the first gear shifter 16 and the second gear shifter 17 can be connected with the second gear set 154 in the meshing manner by driving the first gear set 152 and the third gear set 156 to slide transversely, so as to achieve a purpose of converting an output torque and a rotating speed.

In addition, as shown in FIG. 3, the first gear shifter 16 comprises a toggle base 163 with a sliding chute 161 and a center pin 162, a shifting lever sliding block 165 with a speed regulation shifting lever 164, and a shift gear rotating cylinder 167 with a rotating spring 166. The shift gear rotating cylinder 167 is sleeved on the center pin 162. The shifting lever sliding block 165 is arranged in the sliding chute 161 in a sliding manner. The shift gear rotating cylinder 167 is connected with the shifting lever sliding block 165 in a driving manner. The speed regulation shifting lever 164 is arranged adjacent to the first gear set 152. During operation, the shift gear rotating cylinder 167 can be pulled to rotate by a steel wire so that the shifting lever sliding block 165 slides in the sliding chute 161 so as to drive the shifting lever sliding block 165 to toggle the first gear set 152, and so that the first gear set 152 freely slides to the gear meshing position on the main rotating shaft 151, and thus, the large gear of the first gear set 152 is connected with the small gear of the second gear set 154 in the meshing manner, or the medium gear of the first gear set 152 is connected with the medium gear of the second gear set 154 in the meshing manner, or the small gear of the first gear set 152 is connected with the large gear of the second gear set 154 in the meshing manner. When the steel wire is released, the rotating spring 166 enables the shift gear rotating cylinder 167 to rotate, and the shifting lever sliding block 165 slides reversely to reset the shift gear rotating cylinder. A structure and a working principle of the second gear shifter 17 are same as those of the first gear shifter 16. A speed regulation shifting lever 174 of the second gear shifter 17 is arranged adjacent to the third gear set 156.

Embodiment 2

Figure 4:
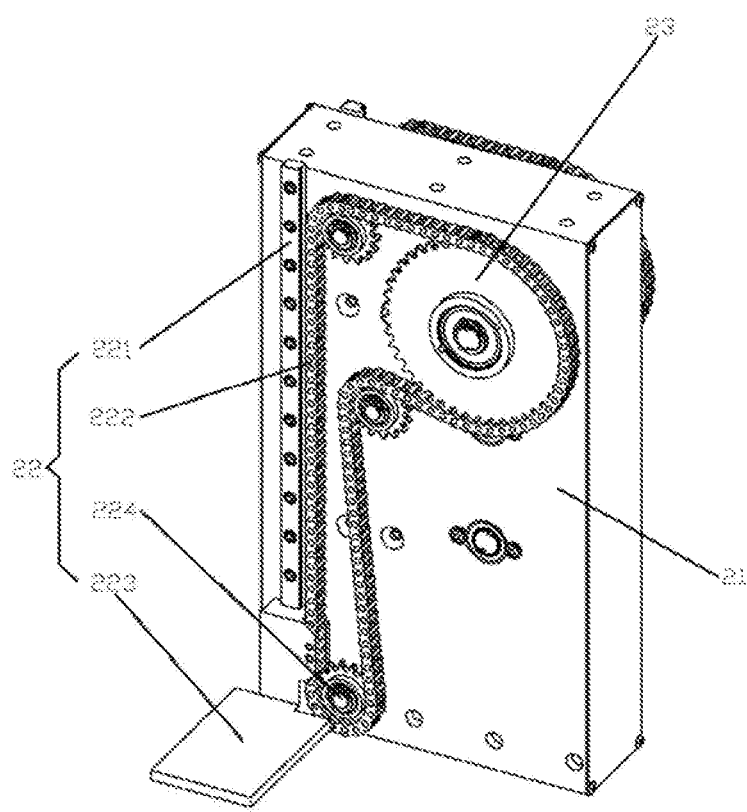
FIG. 4 is a structural schematic view of a device for converting reciprocating rectilinear motion into unidirectional circular motion according to embodiment 2.

As shown in FIG. 4, the present embodiment provides a device 2 for converting reciprocating rectilinear motion into unidirectional circular motion. A difference between the device 2 for converting reciprocating rectilinear motion into unidirectional circular motion and the device 1 for converting reciprocating rectilinear motion into unidirectional circular motion is that a reciprocating rectilinear motion mechanism 22 comprises a rectilinear slide rail 221, a pedal 223 arranged on the rectilinear slide rail 221 in the sliding manner, a transmission chain 222 fixedly connected with the pedal 223 and three auxiliary chain wheels 224. The rectilinear slide rail 221 is fixedly arranged on a main body 21. The transmission chain 222 is connected with the three auxiliary chain wheels 224 and the rotating wheels on the same sides in the transmission linkage manner, so that the reciprocating rectilinear motion mechanism 22 is connected with the rotating wheel on the same side in the transmission manner, and thus the reciprocating rectilinear motion mechanism 22 is connected with a rectilinear motion conversion mechanism 23 in the transmission manner. In the present embodiment, the number of the auxiliary chain wheels 224 can be increased and decreased according to actual needs. During operation, the pedal 223 makes rectilinear up and down motion on the rectilinear slide rail 221 to drive the transmission chain 222 to perform transmission, so that the rotating wheels are rotated.

Embodiment 3

Figure 5:
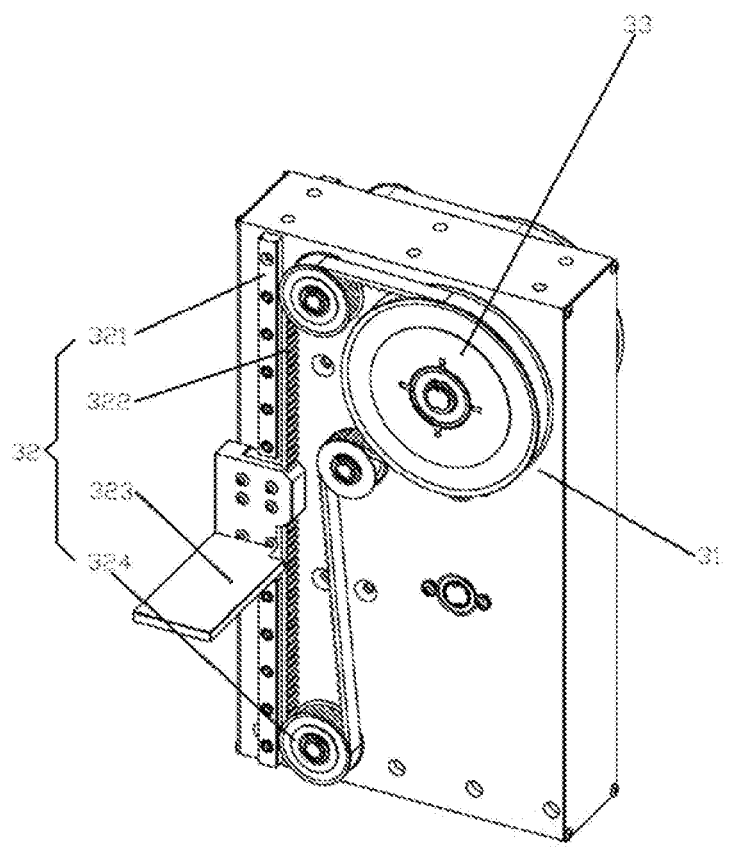
FIG. 5 is a structural schematic view of a device for converting reciprocating rectilinear motion into unidirectional circular motion according to embodiment 3.

As shown in FIG. 5, the present embodiment provides a device 3 for converting reciprocating rectilinear motion into unidirectional circular motion. A difference between the device 3 for converting reciprocating rectilinear motion into unidirectional circular motion and the device 1 for converting reciprocating rectilinear motion into unidirectional circular motion is that a reciprocating rectilinear motion mechanism 32 comprises a rectilinear slide rail 321, a pedal 323 arranged on the rectilinear slide rail 321 in the sliding manner, a transmission belt 322 fixedly connected with the pedal 323 and three auxiliary belt wheels 324. The rectilinear slide rail 321 is fixedly arranged on a main body 31. The transmission chain 322 is connected with the three auxiliary belt wheels 324 and the rotating wheels on the same sides in a belt transmission manner, so that the reciprocating rectilinear motion mechanism 32 is connected with the rotating wheel on the same side in the transmission manner, and thus the reciprocating rectilinear motion mechanism 32 is connected with a rectilinear motion conversion mechanism 33 in the transmission manner. In the present embodiment, the number of the auxiliary belt wheels 324 can be increased and decreased according to actual needs.

During operation, the pedal 323 makes rectilinear up and down motion on the rectilinear slide rail 321 to drive the transmission belt 322 to perform transmission, so that the rotating wheels are rotated.

Embodiment 4

Figure 6:
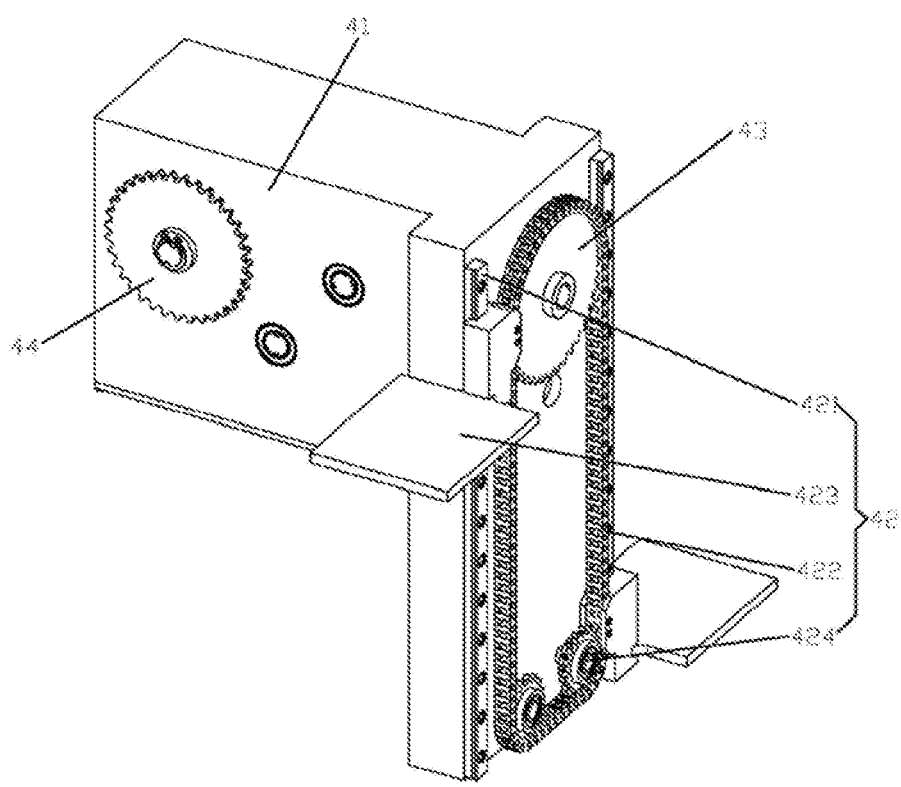
FIG. 6 is a structural schematic view of a device for converting reciprocating rectilinear motion into unidirectional circular motion according to embodiment 4.
Figure 7:
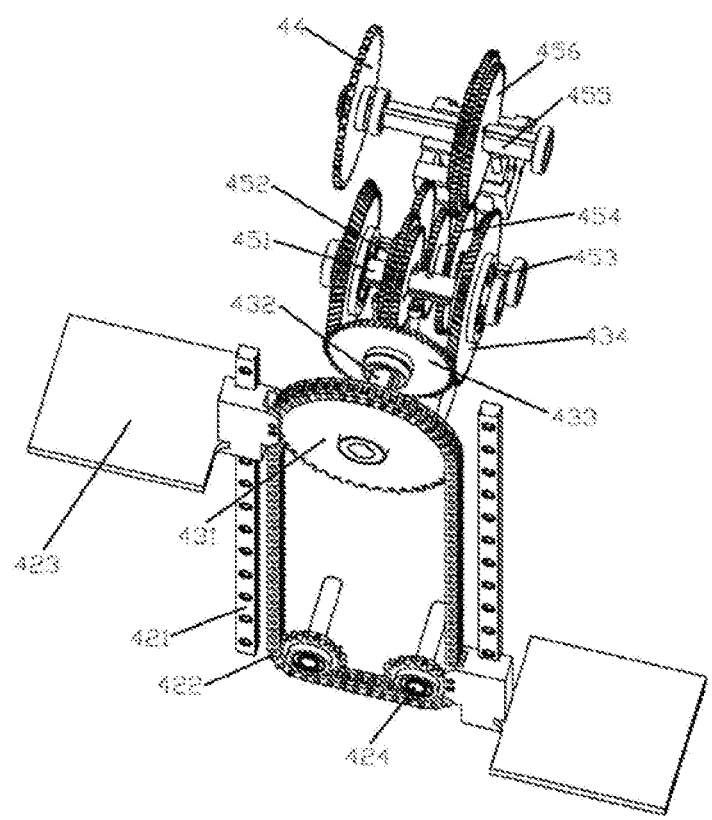
FIG. 7 is a structural schematic view of the device for converting reciprocating rectilinear motion into unidirectional circular motion without a main body shown in FIG. 6.

As shown in FIG. 6 and FIG. 7, the present embodiment provides a device 4 for converting reciprocating rectilinear motion into unidirectional circular motion. A difference between the device 4 for converting reciprocating rectilinear motion into unidirectional circular motion and the device 1 for converting reciprocating rectilinear motion into unidirectional circular motion is that a rectilinear motion conversion mechanism 43 comprises an input gear 431, an input rotating shaft 432 configured to penetrate through a main body 41, a main bevel gear 433 and two side bevel gears 434. The input rotating shaft 432 is connected with the main body 41 through the bearings. The input gear 431 is synchronously and rotatably connected with one end of the input rotating shaft 432 located outside the main body 41 through a key groove. The main bevel gear 433 is synchronously and rotatably connected with one end of the input rotating shaft 432 located in the main body 41 through a key groove. Both ends of the first rotating shaft 451 are also respectively connected with the side bevel gears 434 by unidirectional bearings (not shown) in the unidirectional and synchronous rotating manner. Each of the side bevel gears 434 is connected with the main bevel gear 433 in the meshing manner. The reciprocating rectilinear motion mechanisms 42 are respectively arranged on two opposite sides of the input gear 431. Each of the reciprocating rectilinear motion mechanisms 42 is connected with the input gear 431 in the transmission manner.

Figure 8:
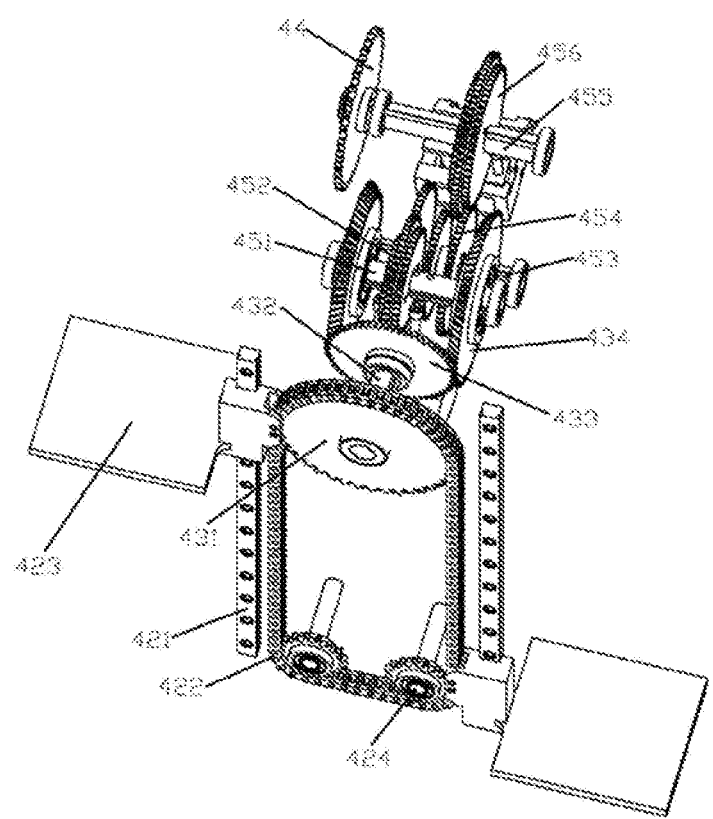
FIG. 8 is a structural schematic view the device for converting reciprocating rectilinear motion into unidirectional circular motion shown in FIG. 6 in another angle.

As shown in FIG. 7 and FIG. 8, a rotating speed regulation mechanism 45 comprises a first gear set 452 arranged on a first rotating shaft 451, a second gear set 454 arranged on a second rotating shaft 453 and a third gear set 456 arranged on a third rotating shaft 455. Each of the first gear set 452, the second gear set 454 and the third gear set 456 comprises a large gear, a medium gear and a small gear with diameters decreased progressively. The first gear set 452, the second gear set 454 and the third gear set 456 are arranged triangularly.

As shown in FIG. 6 and FIG. 7, the input gear 431 is a chain wheel. The reciprocating rectilinear motion mechanism 42 comprises a rectilinear slide rail 421, a pedal 423 arranged on the rectilinear slide rail 421 in the sliding manner, a transmission chain 422 fixedly connected with the pedal 423, and two auxiliary chain wheels 424. In the present embodiment, as shown in FIG. 6, two reciprocating rectilinear motion mechanisms 42 located on two opposite sides of the chain wheel (i.e., the input gear 431) share one transmission chain 422 and two auxiliary chain wheels 424. The rectilinear slide rails 421 of the two reciprocating rectilinear motion mechanisms 42 are fixedly arranged on the main body 41 respectively. The transmission chain 422 is connected with the two auxiliary chain wheels 424 and the chain wheel (i.e., the input gear 431) in a transmission linkage manner so that the two reciprocating rectilinear motion mechanisms 42 are connected with the chain wheel (i.e., the input gear 431) in the transmission manner, and thus the two reciprocating rectilinear motion mechanisms 42 are connected with the rectilinear motion conversion mechanism 43 in the transmission manner.

During operation, the pedal 423 makes the rectilinear up and down motion on the rectilinear slide rail 421 to drive the transmission chain 422 to rotate, so that the chain wheel (i.e., the input gear 431) is rotated, and thus, the main bevel gear 423 is rotated synchronously to drive the two side bevel gears 434 to rotate. The unidirectional bearings are arranged so that the first rotating shaft 451 can be only rotated with the side bevel gears 434 unidirectionally and synchronously. After the first rotating shaft 451 is rotated synchronously, the first gear set 452, the second gear set 454 and the third gear set 456 can be sequentially driven to rotate. Finally, under synchronous rotation of the third rotating shaft 455, an output chain wheel 44 completes power output of circular motion. During operation, a first gear shifter 46 and a second gear shifter 47 can be respectively connected with the second gear set 454 in the meshing manner by driving the first gear set 452 and the third gear set 456 to slide transversely, so as to achieve a purpose of converting an output torque and a rotating speed.

Embodiment 5

Figure 9:
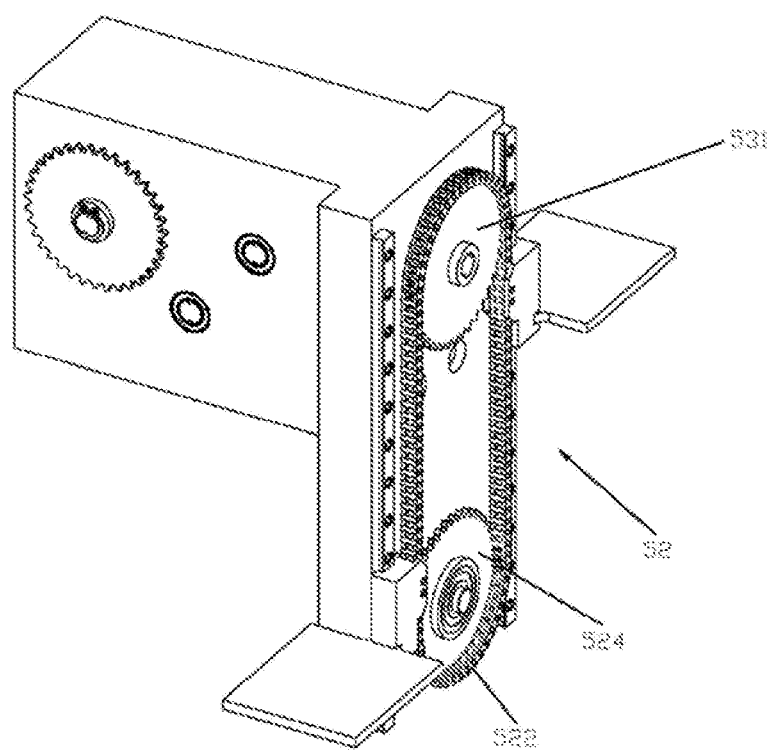
FIG. 9 is a structural schematic view of a device for converting reciprocating rectilinear motion into unidirectional circular motion in an embodiment 5.

As shown in FIG. 9, the present embodiment provides a device 5 for converting reciprocating rectilinear motion into unidirectional circular motion. A difference between the device 5 for converting reciprocating rectilinear motion into unidirectional circular motion and the device 4 for converting reciprocating rectilinear motion into unidirectional circular motion is that the number of auxiliary chain wheels 524 is one. A transmission chain 522 is connected with the auxiliary chain wheel 524 and a chain wheel (i.e., an input gear 531) in the transmission linkage manner so that two reciprocating rectilinear motion mechanisms 52 are connected with the chain wheel (i.e., the input gear 531) in the transmission manner. It can be seen that the number of the auxiliary chain wheels 524 can be increased and decreased according to the actual needs. In addition, the transmission chain 522 can also be replaced with a transmission belt (not shown), and the auxiliary chain wheel 524 also needs to be replaced with an auxiliary belt wheel.

Embodiment 6

Figure 10:
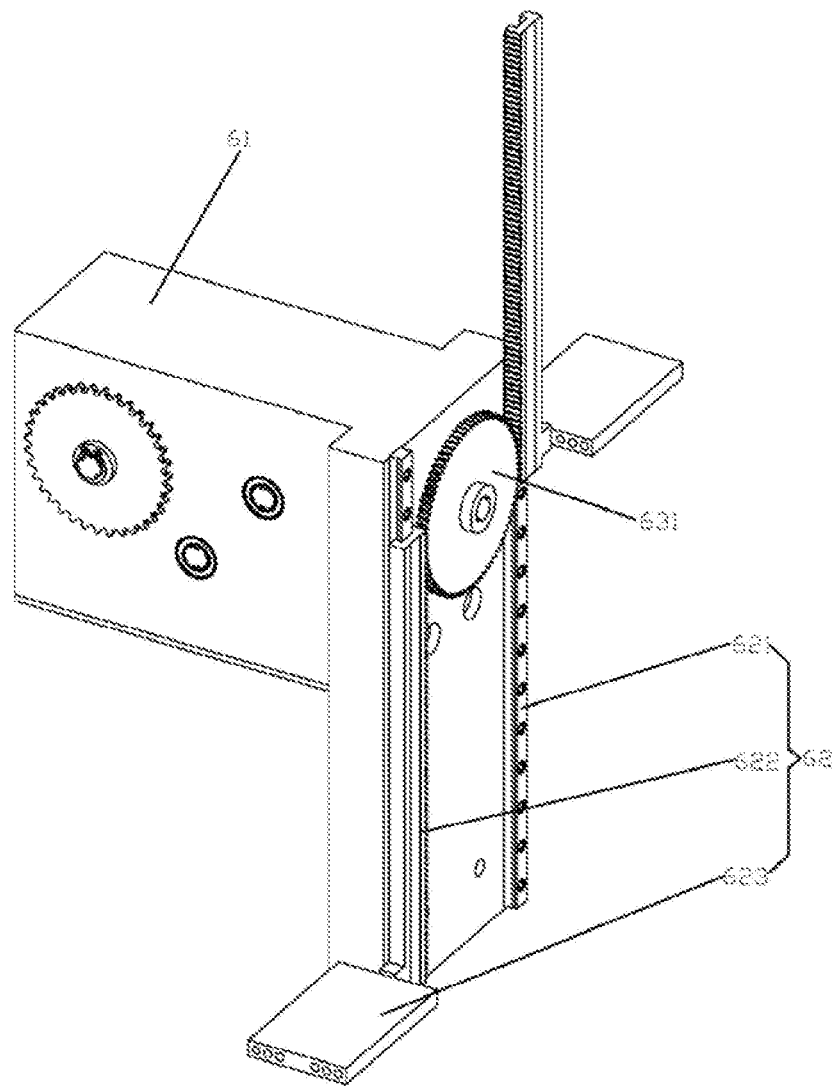
FIG. 10 is a structural schematic view of a device for converting reciprocating rectilinear motion into unidirectional circular motion according to embodiment 6.

As shown in FIG. 10, the present embodiment provides a device 6 for converting reciprocating rectilinear motion into unidirectional circular motion. A difference between the device 6 for converting reciprocating rectilinear motion into unidirectional circular motion and the device 4 for converting reciprocating rectilinear motion into unidirectional circular motion is that each of reciprocating rectilinear motion mechanisms 62 comprises a rectilinear slide rail 621, a rack 622 arranged on the rectilinear slide rail 621 in the sliding manner and a pedal 623 arranged on the rack 622. The rectilinear slide rails 621 are fixedly arranged on a main body 61. The racks 622 are connected with an input gear 631 in the meshing manner so that the reciprocating rectilinear motion mechanisms 62 are connected with the input gear 631 in the transmission manner.

Embodiment 7

Figure 11:
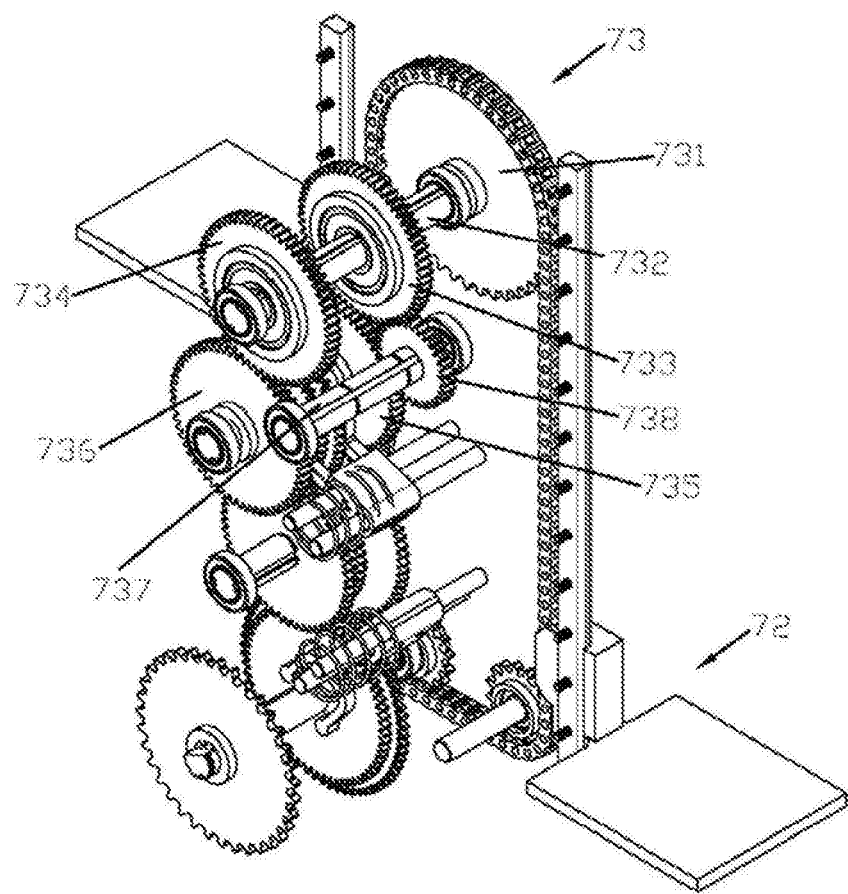
FIG. 11 is a structural schematic view of a device for converting reciprocating rectilinear motion into unidirectional circular motion without a main body according to embodiment 7.

As shown in FIG. 11, the present embodiment provides a device 9 for converting reciprocating rectilinear motion into unidirectional circular motion. A difference between the device 7 for converting reciprocating rectilinear motion into unidirectional circular motion and the device 4 for converting reciprocating rectilinear motion into unidirectional circular motion in the embodiment 4 is that a rectilinear motion conversion mechanism 73 comprises an input gear 731, an input rotating shaft 732 configured to penetrate through a main body (not shown), a first driving gear 733, a second driving gear 734, a first driven gear 735, a second driven gear 736, an auxiliary rotating shaft 737 and a pinion 738. The input rotating shaft 732 is connected with the main body through the bearings. The input gear 731 is synchronously and rotatably connected with one end of the input rotating shaft 732 located outside the main body. The first driving gear 733 is connected with one end of the input rotating shaft 732 located in the main body by a first unidirectional bearing (not shown) in the unidirectional and synchronous rotating manner. The second driving gear 734 is connected with one end of the input rotating shaft 732 located in the main body by a second unidirectional bearing (not shown) in the unidirectional and synchronous rotating manner. A mounting direction of the first unidirectional bearing is configured oppositely to the mounting direction of the second unidirectional bearing. Both ends of a first rotating shaft 551 are further synchronously and rotatably connected with the first driven gear 735 and the second driven gear 736 respectively. Both ends of the auxiliary rotating shaft 737 are respectively connected with the main body through the bearings. The pinion 738 is synchronously and rotatably connected to the auxiliary rotating shaft 737. The pinion 738 is respectively connected with the first driving gear 733 and the first driven gear 735 in the meshing manner. The second driving gear 734 is connected with the second driven gear 736 in the meshing manner. Reciprocating rectilinear motion mechanisms 72 are respectively arranged on two opposite sides of the input gear 731. Each of the reciprocating rectilinear motion mechanisms 72 is connected with the input gear 731 in the transmission manner.

During operation, the input gear 731 is rotated clockwise (or counterclockwise) under transmission of the reciprocating linear motion mechanisms 72, thereby driving the input rotating shaft 732 to rotate synchronously. Since the first unidirectional bearing and the second unidirectional bearing are arranged oppositely, the first driving gear 733 and the second driving gear 734 are unidirectionally rotated to different directions. The first driving gear 733 drives the first driven gear 735 to rotate by the pinion 738. The second driving gear 734 directly drives the second driven gear 736 to rotate. The first driven gear 735 and the second driven gear 736 can only be rotated clockwise or counterclockwise unidirectionally by reversing of the pinion 738.

Figure 12:
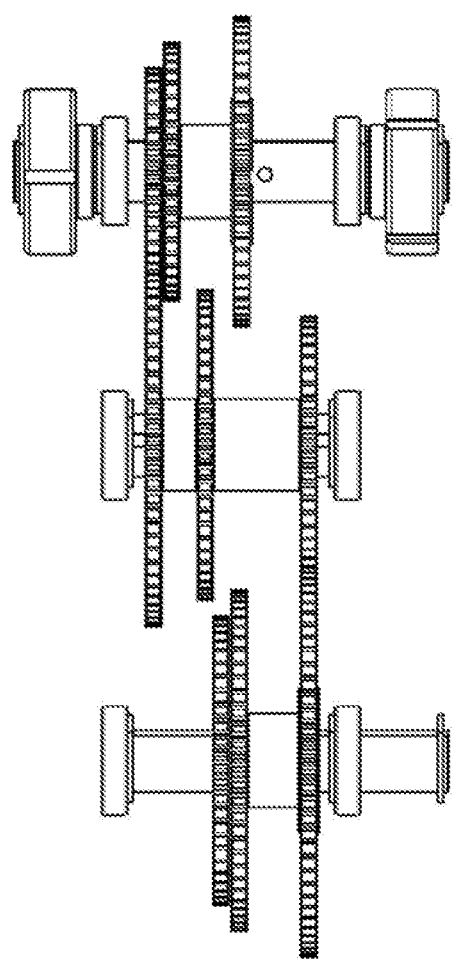
FIG. 12 is a schematic view of another arrangement structure of gear sets of a device for converting reciprocating rectilinear motion into unidirectional circular motion in the present invention.

In addition, the gears of each of the gear sets in the embodiment 1 to the embodiment 7 are arranged in a sequence of the small gear, the large gear and the medium gear; and the speed can be changed in a saltatory manner. Also, as shown in FIG. 12, the gears of each of the gear sets are arranged according to a sequence of the large gear, the medium gear and the small gear; and the speed can be changed step by step. The reciprocating rectilinear motion mechanism and the rectilinear motion conversion mechanism can be connected in the transmission manner by a combination of the rack and the gear, or a combination of the chain and the chain wheel or the combination of the belt and the belt wheel in the embodiment 1 to the embodiment 7, and can also be connected in the transmission manner by a combination of a steel wire rope and a steel wire wheel. A main implementation mode is that a certain part of the steel wire rope is fixed on a main wheel, and both ends of the steel wire rope are respectively wound by two circles in a clockwise direction and a counterclockwise direction. The implementation mode like the belt wheel can be realized by determining that the lengths of the steel wire ropes wound on the steel wire wheel in two directions are longer than the stroke of the slide rail. But a space occupied by transmission with the steel wire rope is smaller. Besides, those skilled in the art can arrange more gear sets in the present invention according to needs of specific conditions, so as to realize more-stage speed changing effect.

Embodiment 8

Figure 13:
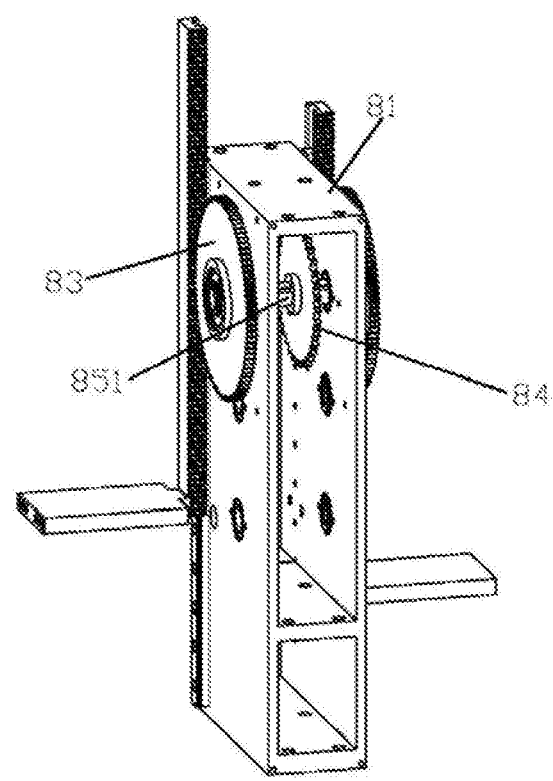
FIG. 13 is a structural schematic view of a device for converting reciprocating rectilinear motion into unidirectional circular motion according to embodiment 8.

As shown in FIG. 13, the present embodiment provides a device 8 for converting reciprocating rectilinear motion into unidirectional circular motion. A difference between the device 8 for converting reciprocating rectilinear motion into unidirectional circular motion and the device 1 for converting reciprocating rectilinear motion into unidirectional circular motion provided by the embodiment 1 is that rectilinear motion conversion mechanisms 83 (i.e., rotating wheels arranged on both sides of a main body 81) are respectively connected with both ends of a main rotating shaft 851 by unidirectional bearings (not shown) in the unidirectional and synchronous rotating manner. The main rotating shaft 851 is directly connected with a circular motion outputting mechanism 84 (i.e., an output chain wheel) by a key groove synchronously and rotatably. Since the device 8 for converting reciprocating rectilinear motion into unidirectional circular motion in the present embodiment does not comprise the rotating speed regulation mechanism, the device 8 can only convert a reciprocating rectilinear motion mode into a unidirectional circular motion mode and has no multi-stage speed changing function.

Embodiment 9

Figure 14:
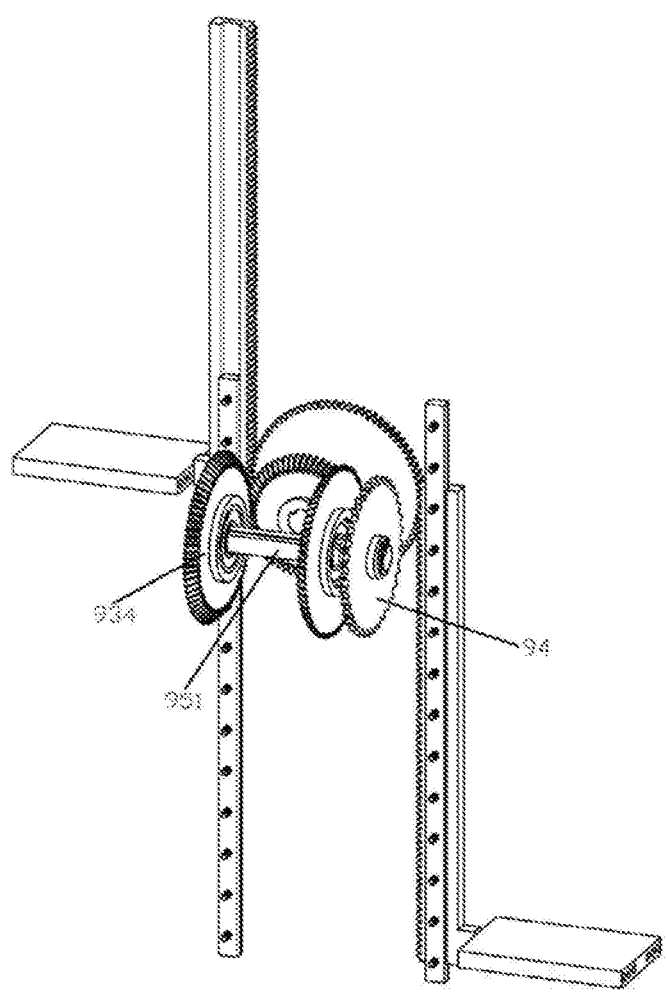
FIG. 14 is a structural schematic view of a device for converting reciprocating rectilinear motion into unidirectional circular motion without a main body according to embodiment 9.

As shown in FIG. 14, the present embodiment provides a device 9 for converting reciprocating rectilinear motion into unidirectional circular motion. A difference between the device 9 for converting reciprocating rectilinear motion into unidirectional circular motion and the device 6 for converting reciprocating rectilinear motion into unidirectional circular motion provided by the embodiment 6 is that two side bevel gears 934 are respectively connected with both ends of a driving rotating shaft 951 by unidirectional bearings (not shown) in the unidirectional and synchronous rotating manner. The driving rotating shaft 951 is directly connected with a circular motion outputting mechanism 94 (i.e., an output chain wheel) by a key groove synchronously and rotatably. Since the device 9 for converting reciprocating rectilinear motion into unidirectional circular motion in the present embodiment also does not comprise the rotating speed regulation mechanism, the device 9 can only convert the reciprocating rectilinear motion mode into the unidirectional circular motion mode and has no multi-stage speed changing function.

Embodiment 10

Figure 15:
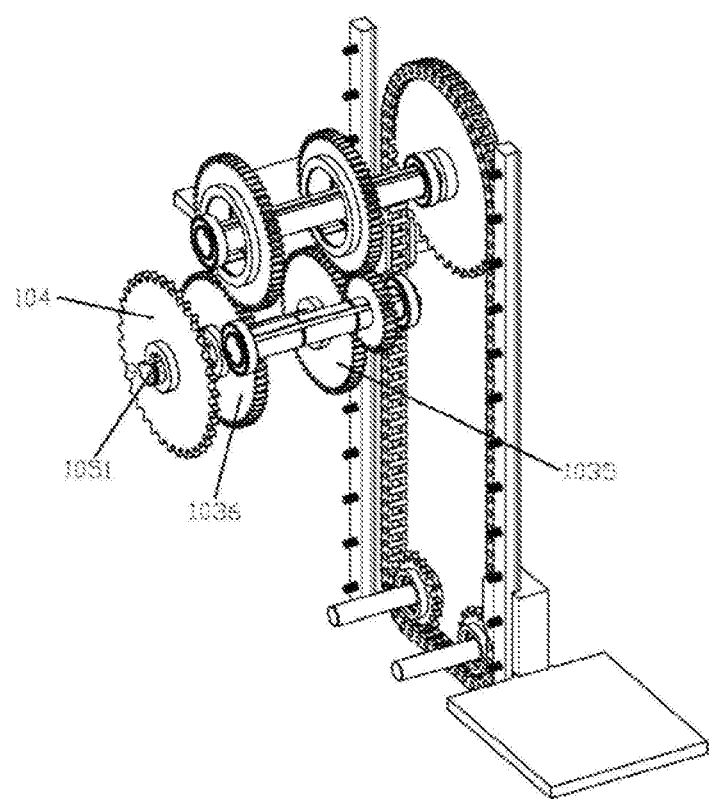
FIG. 15 is a structural schematic view of a device for converting reciprocating rectilinear motion into unidirectional circular motion without a main body according to embodiment 10.

As shown in FIG. 15, the present embodiment provides a device 10 for converting reciprocating rectilinear motion into unidirectional circular motion. A difference between the device 10 for converting reciprocating rectilinear motion into unidirectional circular motion and the device 8 for converting reciprocating rectilinear motion into unidirectional circular motion in the embodiment 7 is that a first driven gear 1035 and a second driven gear 1046 are synchronously and rotatably connected with both ends of a driving rotating shaft 1051 respectively. The driving rotating shaft 1051 is directly connected with a circular motion outputting mechanism 104 (i.e., an output chain wheel) by a key groove synchronously and rotatably. Since the device 10 for converting reciprocating rectilinear motion into unidirectional circular motion in the present invention also does not comprise the rotating speed regulation mechanism either, the device 10 can only convert the reciprocating rectilinear motion mode into the unidirectional circular motion mode and has no multi-stage speed changing function.

Embodiment 11

Figure 16:
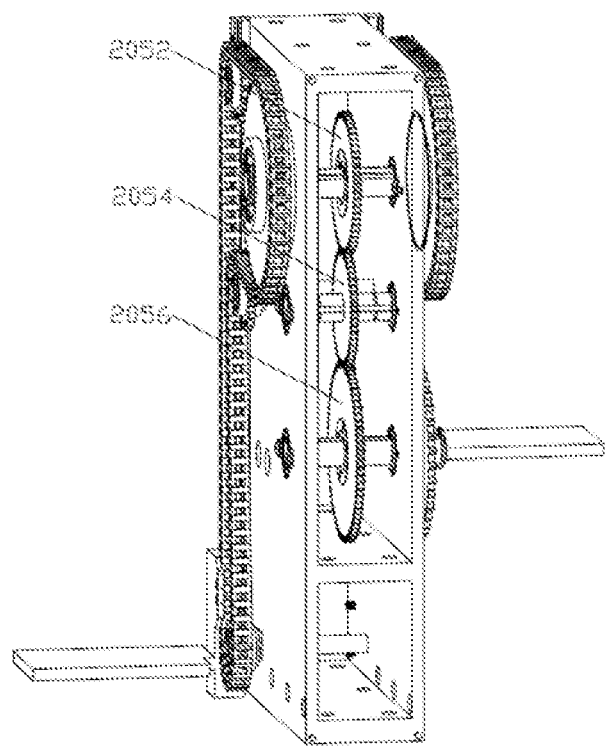
FIG. 16 is a structural schematic view of a device for converting reciprocating rectilinear motion into unidirectional circular motion according to embodiment 11.

As shown in FIG. 16, the present embodiment provides a device 20 for converting reciprocating rectilinear motion into unidirectional circular motion. A difference between the device 20 for converting reciprocating rectilinear motion into unidirectional circular motion and the device 2 for converting reciprocating rectilinear motion into unidirectional circular motion in the embodiment 2 is that each of a first gear set 2052, a second gear set 2054 and a third gear set 2056 has only one gear and does not have a first gear shifter and a second gear shifter so that the device can only convert the reciprocating rectilinear motion mode into the unidirectional circular motion mode, only has a one-stage speed changing function and has no multi-stage speed changing function.

Figure 17:
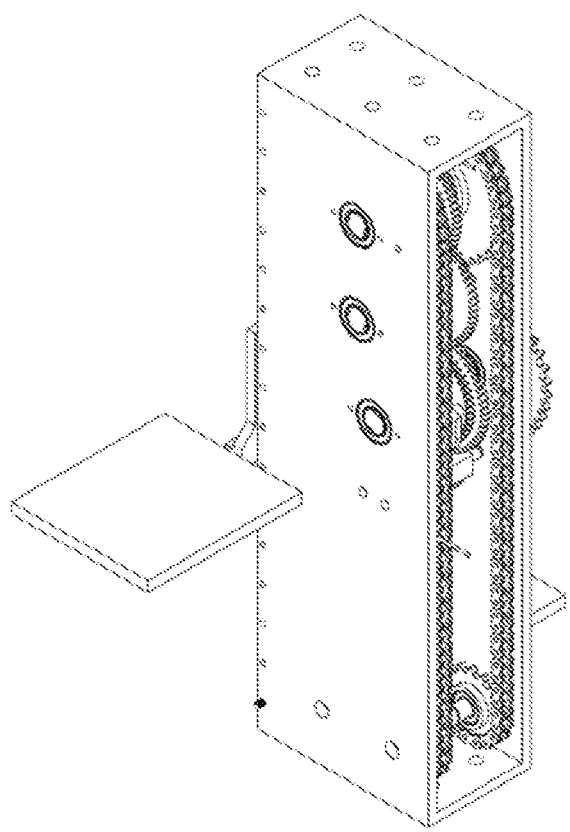
FIG. 17 is a structural schematic view of a device for converting reciprocating rectilinear motion into unidirectional circular motion according to embodiment 12.
Figure 18:
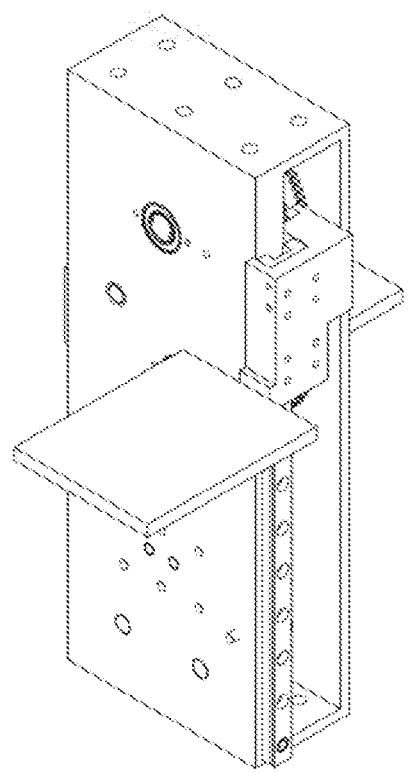
FIG. 18 is a structural schematic view of a device for converting reciprocating rectilinear motion into unidirectional circular motion according to embodiment 13.

In addition, all the synchronous rotating connections in the embodiment 1 to embodiment 11 are realized by the key grooves and can also be realized by shaft sleeves and other manners. Furthermore, in order to make a structure of the device for converting reciprocating rectilinear motion into unidirectional circular motion in the present invention more compact, except two pedals, all components of the reciprocating rectilinear motion mechanism in the embodiment 1 to the embodiment 11 are arranged in the main body by fine structural regulation, such as decrease of the number of the gears of the gear sets of the rotating speed regulation mechanism, position regulation of the input gear of the rectilinear motion conversion mechanism and the like, specifically as shown in FIG. 17 (embodiment 12) and FIG. 18 (embodiment 13).

Embodiment 14

Figure 19:
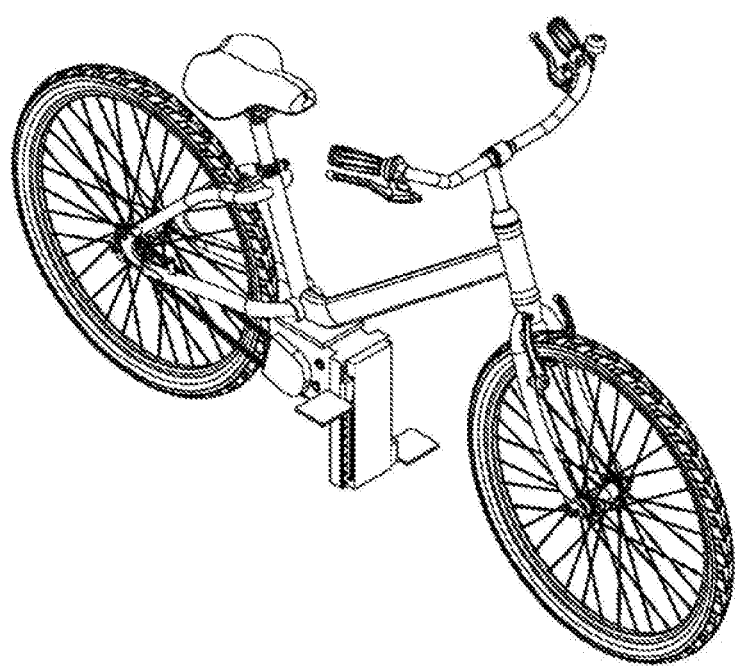
FIG. 19 is a structural schematic view of a human-powered vehicle according to embodiment 12.

As shown in FIG. 19, the present embodiment provides a human-powered vehicle. The human-powered vehicle is particularly a bicycle which comprises power outputting structures (i.e., wheels) and the device for converting reciprocating rectilinear motion into unidirectional circular motion mentioned in any one of the embodiment 1 to the embodiment 13. Circular motion outputting mechanisms (i.e., output chain wheels) of the device for converting reciprocating rectilinear motion into unidirectional circular motion are connected with the power outputting structures (i.e., wheels) by a transmission chain in a transmission manner. In this way, two pedals of the device for converting reciprocating rectilinear motion into unidirectional circular motion can be stepped rectilinearly to drive the wheels of the bicycle to rotate, thereby achieving a purpose of freely driving the bicycle. Compared with a traditional bicycle using a mode of pedaling by circular motion, the bicycle saves more labor.

Embodiment 15

Figure 20:
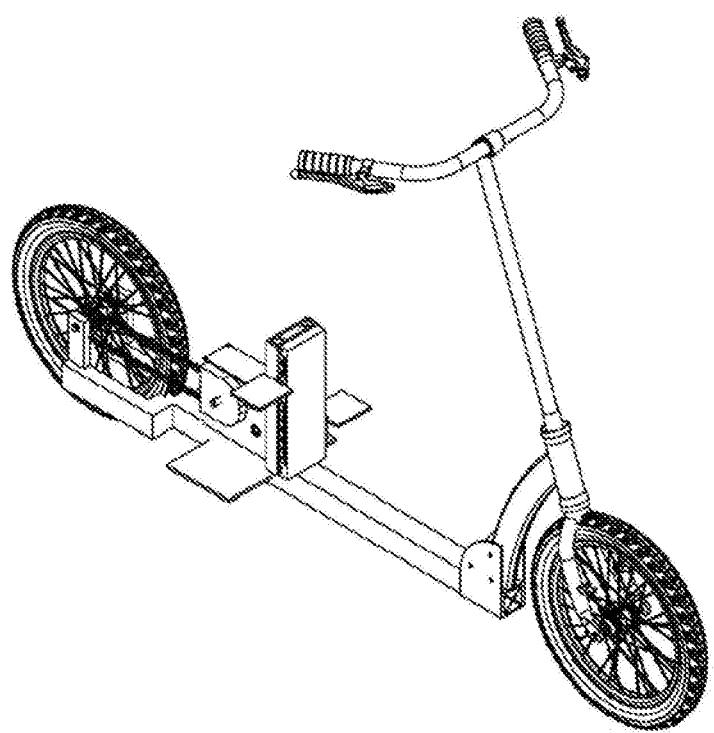
FIG. 20 is a structural schematic view of a human-powered vehicle according to embodiment 13.

As shown in FIG. 20, the present embodiment provides a human-powered vehicle. The human-powered vehicle is particularly a standup riding vehicle which comprises a power outputting structure (i.e., a wheel) and the device for converting reciprocating rectilinear motion into unidirectional circular motion mentioned in any one of the embodiment 1 to the embodiment 13. A circular motion outputting mechanism (i.e., an output chain wheel) of the device for converting reciprocating rectilinear motion into unidirectional circular motion is connected with the power outputting structure (i.e., the wheel) by a transmission chain in the transmission manner. In this way, two pedals of the device for converting reciprocating rectilinear motion into unidirectional circular motion can be stepped rectilinearly to drive the wheel of the standup riding vehicle to rotate, thereby achieving a purpose of freely driving the standup riding vehicle. Compared with a traditional bicycle using a mode of pedaling by circular motion, the standup riding vehicle saves more labor.

Embodiment 16

Figure 21:
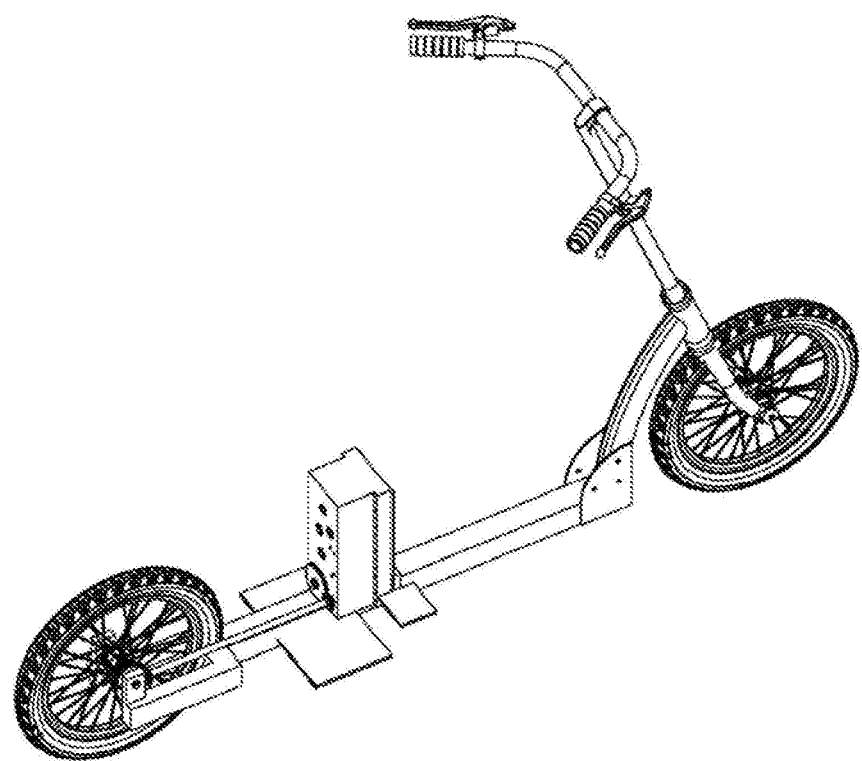
FIG. 21 is a structural schematic view of a human-powered vehicle according to embodiment 14.

As shown in FIG. 21, the present embodiment provides a human-powered vehicle. The human-powered vehicle is particularly a standup riding vehicle which comprises a power outputting structure (i.e., a wheel) and the device for converting reciprocating rectilinear motion into unidirectional circular motion mentioned in any one of the embodiment 1 to the embodiment 13. A circular motion outputting mechanism of the device for converting reciprocating rectilinear motion into unidirectional circular motion is connected with the power outputting structure (i.e., the wheel) by a transmission shaft in the transmission manner. In this way, two pedals of the device for converting reciprocating rectilinear motion into unidirectional circular motion can be stepped rectilinearly to drive the wheel of the standup riding vehicle to rotate, thereby achieving a purpose of freely driving the standup riding vehicle. Compared with a traditional bicycle using a mode of pedaling by circular motion, the standup riding vehicle saves more labor.

Embodiment 17

Figure 22:
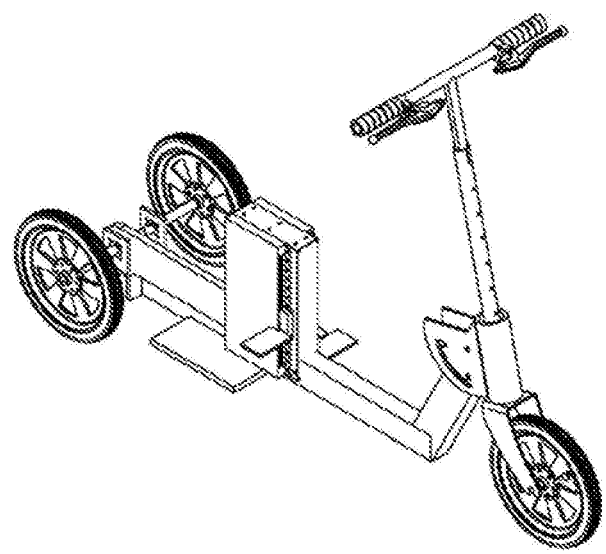
FIG. 22 is a structural schematic view of a human-powered vehicle according to embodiment 15.

As shown in FIG. 22, the present embodiment provides a human-powered vehicle. The human-powered vehicle is particularly a tricycle which comprises power outputting structures (i.e., wheels) and the device for converting reciprocating rectilinear motion into unidirectional circular motion mentioned in any one of the embodiment 1 to the embodiment 13. Circular motion outputting mechanisms (i.e., output chain wheels) of the device for converting reciprocating rectilinear motion into unidirectional circular motion are connected with the power outputting structures (i.e., the wheels) by transmission belts in the transmission manner. In this way, two pedals of the device for converting reciprocating rectilinear motion into unidirectional circular motion can be stepped rectilinearly to drive the wheels of the tricycle to rotate, thereby achieving a purpose of freely driving the tricycle. Compared with a traditional bicycle using a mode of pedaling by circular motion, the tricycle saves more labor.

Embodiment 18

Figure 23:
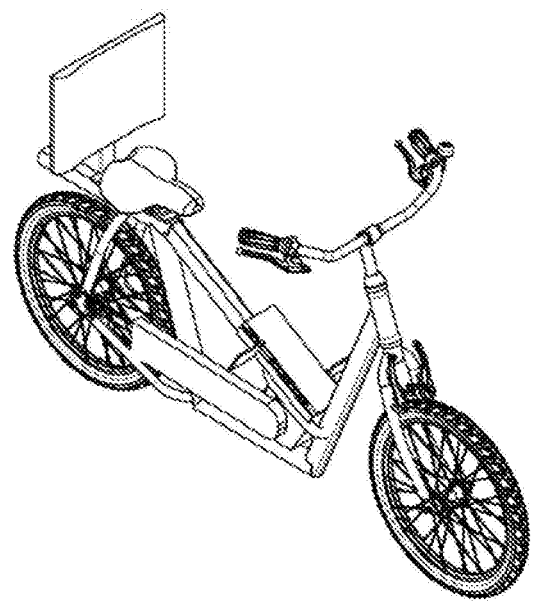
FIG. 23 is a structural schematic view of a human-powered vehicle according to embodiment 16.

As shown in FIG. 23, the present embodiment provides a human-powered vehicle. The human-powered vehicle is particularly a backrest type bicycle which not only comprises power outputting structures (i.e., wheels) and the device for converting reciprocating rectilinear motion into unidirectional circular motion mentioned in any one of the embodiment 1 to the embodiment 13, but also comprises a backrest arranged on a back seat of the backrest type bicycle. The device for converting reciprocating rectilinear motion into unidirectional circular motion is arranged obliquely. Circular motion outputting mechanisms (i.e., output chain wheels) of the device for converting reciprocating rectilinear motion into unidirectional circular motion are connected with the power outputting structures (i.e., the wheels) by a transmission chain in the transmission manner. In this way, two pedals of the device for converting reciprocating rectilinear motion into unidirectional circular motion can be stepped rectilinearly to drive the wheels of the backrest type bicycle to rotate, thereby achieving a purpose of freely driving the backrest type bicycle. Compared with a traditional bicycle using a mode of pedaling by circular motion, the backrest type bicycle saves more labor. The backrest is arranged so that a driver can lie slightly to drive the backrest type bicycle. Meanwhile, by means of the backrest, legs of the driver can better exert force so that the driver can drive more comfortably.

Embodiment 19

Figure 24:
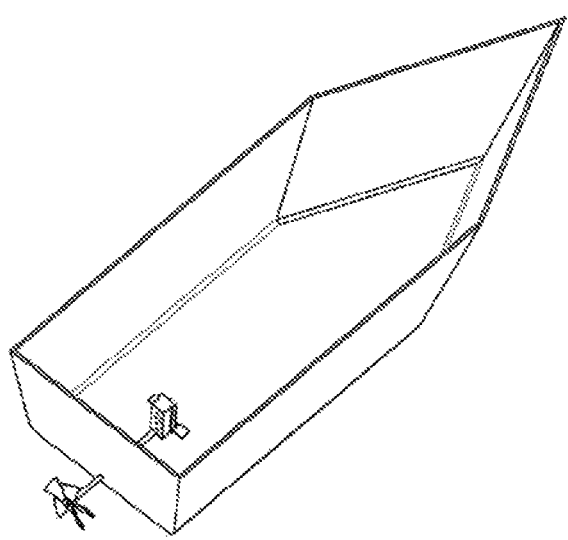
FIG. 24 is a structural schematic view of a human-powered ship according to embodiment 17.

As shown in FIG. 24, the present embodiment provides a human-powered ship. The human-powered ship comprises power outputting structures (i.e., propellers) and the device for converting reciprocating rectilinear motion into unidirectional circular motion mentioned in any one of the embodiment 1 to the embodiment 13. Circular motion outputting mechanisms (i.e., output chain wheels) of the device for converting reciprocating rectilinear motion into unidirectional circular motion are connected with the power outputting structures (i.e., the propellers) by transmission shafts in the transmission manner. In this way, when the human-powered ship moves, two pedals of the device for converting reciprocating rectilinear motion into unidirectional circular motion can be stepped rectilinearly to drive the propellers of the human-powered ship to rotate, thereby achieving a purpose of manually driving the human-powered ship to move.

In addition, besides the human-powered vehicle, the human-powered ship and other transportation vehicles mentioned in the embodiment 14 to the embodiment 19, the device for converting reciprocating rectilinear motion into unidirectional circular motion mentioned in any one of the embodiment 1 to the embodiment 13 can also be applied to other transportation vehicles, for example: a powered parachute, wherein the power outputting mechanism (i.e., propellers) of the powered parachute is connected with a circular motion outputting mechanism of the device for converting reciprocating rectilinear motion into unidirectional circular motion in the transmission manner so that two pedals of the device for converting reciprocating rectilinear motion into unidirectional circular motion can be stepped rectilinearly to drive the propellers of the powered parachute to rotate, thereby achieving a purpose of freely driving the powered parachute; and for another example, a child toy car, wherein the power outputting mechanism (i.e., wheels) of the child toy car is connected with the circular motion outputting mechanism of the device for converting reciprocating rectilinear motion into unidirectional circular motion in the transmission manner so that two pedals of the device for converting reciprocating rectilinear motion into unidirectional circular motion can be stepped rectilinearly to drive the wheels of the child toy car to rotate, thereby achieving a purpose of freely driving the child toy car. Besides, when the device for converting reciprocating rectilinear motion into unidirectional circular motion mentioned in any one of the embodiment 1 to the embodiment 13 is applied to the human-powered vehicle, the child toy car, the human-powered ship, the powered parachute and other transportation vehicles, the circular motion outputting mechanisms (i.e., the output chain wheels) can be connected with the power outputting mechanism (such as the wheels, the propellers and the like) of the transportation vehicles by various transmission ways such as the transmission shaft, the transmission chain, the transmission belt and the like in the transmission manner.

The above-mentioned device for converting reciprocating rectilinear motion into unidirectional circular motion is capable of converting a man-powered rectilinear motion into a circular motion under the conversion of the gear sets and the unidirectional bearings, and the device is simple and compact in structure. Further, the device can achieves a mode of converting the output torque and the rotating speed by transverse sliding meshing of the gear sets, thus it is quite convenient in speed regulation. Moreover, the gears of the gear sets can be arranged in the sequence of the large gears, the medium gears and the small gears; and the speed can be changed step by step. The gears can also be arranged in the sequence of the small gears, the large gears and the medium gears; and the speed is changed in a saltatory manner.

The above are just preferred embodiments of the present invention and are not used for limiting the present invention. Any modification, equivalent replacement, improvement and the like made within spirits and principles of the present invention should be included in a protection scope of the present invention.

What is claimed is:

1. A device for converting reciprocating rectilinear motion into unidirectional circular motion, comprising: a main body; at least one reciprocating rectilinear motion mechanism: a rectilinear motion conversion mechanism connected with the reciprocating rectilinear motion mechanism in a transmission manner for converting the reciprocating rectilinear motion outputted by the reciprocating rectilinear motion mechanism into bidirectional circular motion; and a circular motion outputting mechanism connected with rectilinear motion conversion mechanism in a unidirectional and synchronous rotating manner for outputting the unidirectional circular motion; wherein the reciprocating rectilinear motion mechanism, the rectilinear motion conversion mechanism and the circular motion outputting mechanism arranged in the main body.

2. The device according to claim 1, wherein the rectilinear motion conversion mechanism comprises two rotating wheels oppositely arranged on both sides of the main body; a main rotating spring is arranged between each of the rotating wheels and the main body; each rotating wheel is connected in a transmission manner with the reciprocating rectilinear motion mechanism arranged on a same side with the rotating wheel; a main rotating shaft is arranged between the two rotating wheels; both ends of the main rotating shaft are respectively connected with the rotating wheels on the same sides by unidirectional bearings in the unidirectional and synchronous rotating manner; the main rotating shaft is connected with the circular motion outputting mechanism in the transmission manner so that the rectilinear motion conversion mechanism is connected with the circular motion outputting mechanism in the unidirectional and synchronous rotating manner.

3. The device according to claim 2, further comprising a rotating speed regulation mechanism arranged in the main body; wherein the rotating speed regulation mechanism comprises N gear sets, and N is a number greater than or equal to 2; each of the gear sets comprises a plurality of gears different in diameter; a first gear set of the N gear sets is synchronously and rotatably connected to the main rotating shaft; the rest gear sets of the N gear sets are synchronously and rotatably connected to their corresponding rotating shafts, respectively; both ends of the corresponding rotating shafts are respectively connected with the main body through bearings; in the N gear sets, the gear sets are sequentially connected with each other in a meshing manner; a rotating shaft corresponding to an Nth gear set is synchronously and rotatably connected with the circular motion outputting mechanism; a plurality of gear shifters are arranged in the N gear sets so that adjacent gear sets convert different mutual meshing manners under driving of the gear shifters.

4. The device according to claim 2, wherein the reciprocating rectilinear motion mechanism comprises a rectilinear slide rail, a rack arranged on the rectilinear slide rail in a sliding manner, and a pedal arranged on the rack; the rectilinear sliding rail is fixedly arranged on the main body; the rack is connected with the rotating wheels in the meshing manner so that the reciprocating rectilinear motion mechanism is connected with the rectilinear motion conversion mechanism in the transmission manner.

5. The device according to claim 2, wherein the reciprocating rectilinear motion mechanism comprises a rectilinear slide rail, a pedal arranged on the rectilinear slide rail in the sliding manner, a transmission chain fixedly connected with the pedal, and a plurality of auxiliary chain wheels; the rectilinear sliding rail is fixedly arranged on the main body; and the transmission chain is connected with the auxiliary chain wheels and the rotating wheels in a transmission linkage manner so that the reciprocating rectilinear motion mechanism is connected with the rectilinear motion conversion mechanism in the transmission manner.

6. The device according to claim 1, further comprising a rotating speed regulation mechanism arranged in the main body; wherein the rectilinear motion conversion mechanism is connected with the rotating speed regulation mechanism in the unidirectional and synchronous rotating manner; the rotating speed regulation mechanism is connected with the circular motion outputting mechanism in the transmission manner; the rotating speed regulation mechanism comprises N gear sets, and N is a number greater than or equal to 2; each of the gear sets comprises a plurality of gears different in diameter, each of the gear sets is synchronously and rotatably connected with the corresponding rotating shaft, respectively; both ends of the rotating shafts corresponding to the gear sets are respectively connected with the main body through bearings; in the N gear sets, the gear sets are sequentially connected with each other in a meshing manner; the rotating shaft corresponding to a first gear set is connected with the rectilinear motion conversion mechanism in the unidirectional and synchronous rotating manner; the rotating shaft corresponding to an Nth gear set is synchronously and rotatably connected with the circular motion outputting mechanism; a plurality of gear shifters are arranged in the N gear sets so that the adjacent gear sets convert different mutual meshing manners under driving of the gear shifters.

7. The device according to claim 6, wherein the rotating speed regulation mechanism comprises a first gear set arranged on a first rotating shaft, a second gear set arranged on a second rotating shaft and a third gear set arranged on a third rotating shaft; each of the first, second and third gear sets comprises a large gear, a medium gear and a small gear; the first gear set freely slides to a gear meshing position on the first rotating shaft under the driving of a first gear shifter, so that the large gear of the first gear set is connected with the small gear of the second gear set in a meshing manner, or so that the medium gear of the first gear set is connected with the medium gear of the second gear set in the meshing manner, or so that the small gear of the first gear set is connected with the large gear of the second gear set in the meshing manner; the third gear set freely slides to a gear meshing position on the third rotating shaft under the driving of a second gear shifter, so that the large gear of the third gear set is connected with the small gear of the second gear set in the meshing manner, or so that the medium gear of the third gear set is connected with the medium gear of the second gear set in the meshing manner, or so that the small gear of the third gear set is connected with the large gear of the second gear set in the meshing manner; the circular motion outputting mechanism is synchronously and rotatably connected with one end of the third rotating shaft so that the rotating speed regulation mechanism is connected with the circular motion outputting mechanism in the transmission manner.

8. The device according to claim 7, wherein each of the first and second gear shifters comprises a toggle base with a sliding chute and a center pin, a shifting lever sliding block with a speed regulation shifting lever, and a shift gear rotating cylinder with a rotating spring; the shift gear rotating cylinder is sleeved on the center pin: the shifting lever sliding block is arranged in the sliding chute in a sliding manner; the shift gear rotating cylinder is connected with the shifting lever sliding block in a driving manner; and the speed regulation shifting lever is arranged adjacent to the first gear set or the third gear set.

9. The device according to claim 8, wherein the rectilinear motion conversion mechanism comprises an input gear, an input rotating shaft configured to penetrate through the main body, a main bevel gear and two side bevel gears; the input rotating shaft is connected with the main body through the bearings; the input gear is synchronously and rotatably connected with one end of the input rotating shaft located outside the main body; the main bevel gear is synchronously and rotatably connected with one end of the input rotating shaft located in the main body; both ends of the first rotating shaft are further respectively connected with the side bevel gears by unidirectional bearings in the unidirectional and synchronous rotating manner; each of the side bevel gears is connected with the main bevel gear in the meshing manner; reciprocating rectilinear motion mechanisms are respectively arranged on two opposite sides of the input gear; each of the reciprocating rectilinear motion mechanisms is connected with the input gear in the transmission manner.

10. The device according to any one of claim 9, wherein the reciprocating rectilinear motion mechanism comprises a rectilinear slide rail, a rack arranged on the rectilinear slide rail in a sliding manner, and a pedal arranged on the rack; the rectilinear sliding rail is fixedly arranged on the main body; the rack is connected with the input gear in the meshing manner so that the reciprocating rectilinear motion mechanism is connected with the rectilinear motion conversion mechanism in the transmission manner.

11. The device according to any one of claim 9, wherein the reciprocating rectilinear motion mechanism comprises a rectilinear slide rail, a pedal arranged on the rectilinear slide rail in the sliding manner, a transmission chain fixedly connected with the pedal, and a plurality of auxiliary chain wheels; the rectilinear sliding rail is fixedly arranged on the main body the transmission chain is connected with the auxiliary chain wheels and the input gear in the transmission linkage manner so that the reciprocating rectilinear motion mechanism is connected with the rectilinear motion conversion mechanism in the transmission manner.

12. The device according to claim 8, wherein the rectilinear motion conversion mechanism comprises an input gear, an input rotating shaft configured to penetrate through the main body, a first driving gear, a second driving gear, a first driven gear, a second driven gear, an auxiliary rotating shaft and a pinion; the input rotating shaft is connected with the main body through the bearings; the input gear is synchronously and rotatably connected with one end of the input rotating shaft located outside the main body; the first driving gear is connected with one end of the input rotating shaft located in the main body by a first unidirectional bearing in the unidirectional and synchronous rotating manner; the second driving gear is connected with one end of the input rotating shaft located in the main body by a second unidirectional bearing in the unidirectional and synchronous rotating manner; a mounting direction of the first unidirectional bearing is configured to be opposite to the mounting direction of the second unidirectional bearing; both ends of the first rotating shaft are further synchronously and rotatably connected with the first driven gear and the second driven gear respectively; both ends of the auxiliary rotating shaft are respectively connected with the main body through the bearings; the pinion is synchronously and rotatably connected to the auxiliary rotating shaft; the pinion is respectively connected with the first driving gear and the first driven gear in the meshing manner; the second driving gear is connected with the second driven gear in the meshing manner; reciprocating rectilinear motion mechanisms are respectively arranged on two opposite sides of the input gear; each of the reciprocating rectilinear motion mechanisms is connected with the input gear in the transmission manner.

13. The device according to claim 1, wherein the rectilinear motion conversion mechanism comprises an input gear, an input rotating shaft configured to penetrate through the main body, a main bevel gear and two side bevel gears; the input rotating shaft is connected with the main body through bearings: the input gear is synchronously and rotatably connected with one end of the input rotating shaft located outside the main body; the main bevel gear is synchronously and rotatably connected with one end of the input rotating shaft located in the main body; each of the side bevel gears is connected with the main bevel gear in the meshing manner; reciprocating rectilinear motion mechanisms are respectively arranged on two opposite sides of the input gear; each of the reciprocating rectilinear motion mechanisms is connected with the input gear in the transmission manner; a driving rotating shaft is arranged between the two side bevel gears; both ends of the driving rotating shaft are connected with the side bevel gears by the unidirectional bearings in the unidirectional and synchronous rotating manner; the driving rotating shaft is connected with the circular motion outputting mechanism in the transmission manner so that the rectilinear motion conversion mechanism is connected with the circular motion outputting mechanism in the unidirectional and synchronous rotating manner.

14. The device according to claim 1, wherein the rectilinear motion conversion mechanism comprises an input gear, an input rotating shaft configured to penetrate through the main body, a first driving gear, a second driving gear, a first driven gear, a second driven gear, an auxiliary rotating shaft and a pinion; the input rotating shaft is connected with the main body through bearings; the input gear is synchronously and rotatably connected with one end of the input rotating shaft located outside the main body; the first driving gear is connected with one end of the input rotating shaft located in the main body by a first unidirectional bearing in the unidirectional and synchronous rotating manner; the second driving gear is connected with one end of the input rotating shaft located in the main body by a second unidirectional bearing in the unidirectional and synchronous rotating manner; a mounting direction of the first unidirectional bearing is configured to be opposite to the mounting direction of the second unidirectional bearing; both ends of the auxiliary rotating shaft are respectively connected with the main body through the bearings; the pinion is synchronously and rotatably connected to the auxiliary rotating shaft; the pinion is respectively connected with the first driving gear and the first driven gear in the meshing manner; the second driving gear is connected with the second driven gear in the meshing manner; reciprocating rectilinear motion mechanisms are respectively arranged on two opposite sides of the input gear; each of the reciprocating rectilinear motion mechanisms is connected with the input gear in the transmission manner; a driving rotating shaft is arranged between the first driven gear and the second driven gear; both ends of the driving rotating shaft are synchronously and rotatably connected with the first driven gear and the second driven gear respectively; the driving rotating shaft is connected with the circular motion outputting mechanism in the transmission manner so that the rectilinear motion conversion mechanism is connected with the circular motion outputting mechanism in the unidirectional and synchronous rotating manner.

15. A transportation vehicle, comprising a power outputting mechanism and the device for converting reciprocating rectilinear motion into unidirectional circular motion according to claim 1; wherein the circular motion outputting mechanism is connected with the power outputting mechanism in a transmission manner.

16. The transportation vehicle according to claim 15, wherein the transportation vehicle is a human-powered vehicle, a child toy car, a human-powered ship or a human-powered parachute; the power outputting mechanism is wheels of the human-powered vehicle, wheels of the child toy car, propellers of the human-powered ship or propellers of the human-powered umbrella.

\* \* \* \* \*